(12) United States Patent
Clark

(10) Patent No.: US 11,179,868 B2
(45) Date of Patent: Nov. 23, 2021

(54) SYSTEMS AND METHODS FOR MANUFACTURING BULKED CONTINUOUS FILAMENT

(71) Applicant: Aladdin Manufacturing Corporation, Calhoun, GA (US)

(72) Inventor: Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

(21) Appl. No.: 16/557,076

(22) Filed: Aug. 30, 2019

(65) Prior Publication Data

US 2019/0381699 A1    Dec. 19, 2019

Related U.S. Application Data

(60) Division of application No. 16/432,579, filed on Jun. 5, 2019, now Pat. No. 10,538,016, which is a
(Continued)

(51) Int. Cl.
  *B29B 17/02* (2006.01)
  *D01D 5/00* (2006.01)
  (Continued)

(52) U.S. Cl.
  CPC .......... *B29B 17/02* (2013.01); *B01D 29/0095* (2013.01); *B29B 17/00* (2013.01);
  (Continued)

(58) Field of Classification Search
  CPC ...... B29C 48/385; B29C 48/425; B29C 48/38
  See application file for complete search history.

(56) References Cited

U.S. PATENT DOCUMENTS

| | | |
|---|---|---|
| 1,490,918 A | 4/1924 | Gaede |
| 2,146,532 A | 2/1939 | Crane |
| (Continued) | | |

FOREIGN PATENT DOCUMENTS

| | | |
|---|---|---|
| AU | 2013267847 | 3/2014 |
| AU | 2014215998 | 9/2014 |
| (Continued) | | |

OTHER PUBLICATIONS

"MRS extrusion technology offers new options in PET", Plastics Additives and Compounding, Elsevier Science, Oxofrd, GB, vol. 11, No. 2, Mar. 1, 2009 (Mar. 1, 2009), pp. 24-26, XP026067788, ISSN: 1464-391X. DOI:10.1016/S1464-391X(09)70050-9 [retrieved on Mar. 1, 2009] the whole document.
(Continued)

*Primary Examiner* — Timothy Kennedy
*Assistant Examiner* — Asha A Thomas
(74) *Attorney, Agent, or Firm* — Brient IP Law, LLC

(57) ABSTRACT

Systems for manufacturing bulked continuous carpet filament from polymer, where the systems are configured for: (1) melting polymer (e.g., derived from post-consumer PET bottles) to create a first single stream of polymer melt; (2) separating the first single stream of polymer melt into multiple streams of polymer melt; (3) exposing the multiple streams of polymer melt to a pressure of between about 0 millibars and about 5 millibars; (4) allowing the multiple streams of polymer melt to fall into a receiving section of a melt processing unit; (5) recombining the multiple streams of polymer melt into a second single stream of polymer melt; and (6) providing the second single stream of polymer melt to one or more spinning machines that are configured to form the second single stream of polymer melt into bulked continuous carpet filament.

26 Claims, 8 Drawing Sheets

Related U.S. Application Data continuation-in-part of application No. 16/220,733, filed on Dec. 14, 2018, now Pat. No. 10,532,495, which is a continuation-in-part of application No. 15/419,955, filed on Jan. 30, 2017, now Pat. No. 10,487,422, which is a continuation-in-part of application No. 15/396,143, filed on Dec. 30, 2016, now Pat. No. 10,493,660, which is a continuation of application No. 13/892,713, filed on May 13, 2013, now Pat. No. 9,550,338, which is a division of application No. 13/721,955, filed on Dec. 20, 2012, now Pat. No. 8,597,553.

(60) Provisional application No. 61/654,016, filed on May 31, 2012.

(51) Int. Cl.
| | |
|---|---|
| *B29C 48/38* | (2019.01) |
| *D01D 1/10* | (2006.01) |
| *D01F 6/62* | (2006.01) |
| *B29B 17/00* | (2006.01) |
| *B29C 48/92* | (2019.01) |
| *B29C 48/425* | (2019.01) |
| *C08J 11/06* | (2006.01) |
| *B29D 99/00* | (2010.01) |
| *B01D 29/00* | (2006.01) |
| *D01D 5/08* | (2006.01) |
| *B29C 48/385* | (2019.01) |
| *B29C 48/05* | (2019.01) |
| *C08J 11/04* | (2006.01) |
| *B29C 48/255* | (2019.01) |
| *B29C 48/70* | (2019.01) |
| *B29C 48/44* | (2019.01) |
| *B29C 48/43* | (2019.01) |
| *B29C 48/76* | (2019.01) |
| *B29K 67/00* | (2006.01) |
| *B29K 105/26* | (2006.01) |
| *B29K 105/00* | (2006.01) |
| *B29C 48/435* | (2019.01) |
| *B29C 48/14* | (2019.01) |
| *B29B 13/00* | (2006.01) |

(52) U.S. Cl.
CPC ............ *B29C 48/05* (2019.02); *B29C 48/255* (2019.02); *B29C 48/2552* (2019.02); *B29C 48/38* (2019.02); *B29C 48/385* (2019.02); *B29C 48/425* (2019.02); *B29C 48/43* (2019.02); *B29C 48/44* (2019.02); *B29C 48/70* (2019.02); *B29C 48/92* (2019.02); *B29D 99/0078* (2013.01); *C08J 11/04* (2013.01); *C08J 11/06* (2013.01); *D01D 1/103* (2013.01); *D01D 1/106* (2013.01); *D01D 5/00* (2013.01); *D01D 5/08* (2013.01); *D01F 6/62* (2013.01); *B29B 2013/002* (2013.01); *B29B 2013/005* (2013.01); *B29B 2017/0015* (2013.01); *B29B 2017/0224* (2013.01); *B29C 48/144* (2019.02); *B29C 48/435* (2019.02); *B29C 48/766* (2019.02); *B29C 2948/922* (2019.02); *B29C 2948/92514* (2019.02); *B29C 2948/92876* (2019.02); *B29K 2067/003* (2013.01); *B29K 2105/0067* (2013.01); *B29K 2105/26* (2013.01); *C08J 2367/02* (2013.01); *D10B 2503/04* (2013.01); *H05K 999/99* (2013.01); *Y02P 20/143* (2015.11); *Y02W 30/62* (2015.05)

(56) References Cited

U.S. PATENT DOCUMENTS

| | | | |
|---|---|---|---|
| 3,217,783 A | * | 11/1965 | Rodenacker .......... B29C 48/763 159/2.2 |
| 3,310,837 A | | 3/1967 | Wittrock |
| 3,357,049 A | | 12/1967 | Spindler |
| 3,608,001 A | | 9/1971 | Kowalski et al. |
| 3,825,236 A | | 7/1974 | Hussmann et al. |
| 3,865,528 A | | 2/1975 | Roess |
| 3,938,924 A | | 2/1976 | Abella et al. |
| 4,057,376 A | * | 11/1977 | Berger .................... B29C 48/76 425/73 |
| 4,057,607 A | | 11/1977 | Soehngen et al. |
| 4,172,477 A | | 10/1979 | Reich |
| 4,192,617 A | | 3/1980 | Spielhoff |
| 4,268,176 A | | 5/1981 | Muller |
| 4,269,798 A | | 5/1981 | Ives |
| 4,272,475 A | | 6/1981 | Chi |
| 4,289,409 A | | 9/1981 | Brand |
| 4,370,302 A | | 1/1983 | Suzuoka et al. |
| 4,564,349 A | | 1/1986 | Brown |
| 4,591,487 A | | 5/1986 | Fritsch |
| 4,675,378 A | | 6/1987 | Gibbon et al. |
| 4,919,872 A | | 4/1990 | Fintel |
| 5,102,594 A | | 4/1992 | Burlet et al. |
| 5,108,711 A | | 4/1992 | Chszaniecki |
| 5,143,308 A | | 9/1992 | Hally et al. |
| 5,224,383 A | | 7/1993 | Pinto et al. |
| 5,225,130 A | | 7/1993 | Deiringer |
| 5,266,601 A | | 11/1993 | Kyber et al. |
| 5,306,803 A | | 4/1994 | Arlt et al. |
| 5,339,255 A | | 8/1994 | Suzuki et al. |
| 5,393,140 A | | 2/1995 | Blach |
| 5,424,013 A | | 6/1995 | Lieberman |
| 5,427,881 A | | 6/1995 | Sacripante et al. |
| 5,459,168 A | | 10/1995 | Nasr et al. |
| 5,497,562 A | | 3/1996 | Pikus |
| 5,503,788 A | | 4/1996 | Lazareck et al. |
| 5,510,073 A | | 4/1996 | Kaegi et al. |
| 5,532,035 A | | 7/1996 | Corbin et al. |
| 5,549,957 A | | 8/1996 | Negola et al. |
| 5,554,657 A | | 9/1996 | Brownscombe et al. |
| 5,613,285 A | | 3/1997 | Chester et al. |
| 5,623,012 A | | 4/1997 | Hwo |
| 5,715,584 A | | 2/1998 | Coons, III et al. |
| 5,804,115 A | | 9/1998 | Burton et al. |
| 5,836,682 A | | 11/1998 | Blach |
| 5,886,058 A | | 3/1999 | Van Erden et al. |
| 5,893,702 A | | 4/1999 | Conrad et al. |
| 5,932,691 A | | 8/1999 | Khanin et al. |
| 5,945,215 A | | 8/1999 | Bersted et al. |
| 5,951,159 A | | 9/1999 | Schobert-Csongor et al. |
| 5,958,548 A | | 9/1999 | Negola et al. |
| 5,961,054 A | | 10/1999 | Nishibori |
| 6,007,892 A | | 12/1999 | Harwood et al. |
| 6,074,084 A | | 6/2000 | Kolossow |
| 6,113,825 A | | 9/2000 | Chuah |
| 6,265,533 B1 | | 7/2001 | Regel et al. |
| 6,281,278 B1 | | 8/2001 | Takase et al. |
| 6,394,644 B1 | | 5/2002 | Streiff |
| 6,492,485 B1 | | 12/2002 | Gohr et al. |
| 6,620,354 B1 | | 9/2003 | Bessemer et al. |
| 6,627,127 B1 | | 9/2003 | Piovoso et al. |
| 6,722,117 B2 | | 4/2004 | Belcher, Jr. et al. |
| 6,773,718 B2 | | 8/2004 | Seth et al. |
| 6,780,941 B2 | | 8/2004 | Studholme et al. |
| 6,784,214 B1 | | 8/2004 | Bacher et al. |
| 6,852,256 B2 | | 2/2005 | Borer et al. |
| 6,984,694 B2 | | 1/2006 | Blasius, Jr. et al. |
| 7,025,491 B2 | | 4/2006 | Blach et al. |
| 7,192,545 B2 | | 3/2007 | Ekart et al. |
| 7,198,400 B2 | | 4/2007 | Unterlander et al. |
| 7,204,945 B2 | | 4/2007 | Bonner |
| 7,262,380 B1 | | 8/2007 | Ulrichsen et al. |
| 7,320,589 B2 | | 1/2008 | Babin et al. |
| 7,354,988 B2 | | 4/2008 | Charati et al. |
| 7,380,973 B2 | | 6/2008 | Goedicke et al. |

(56) References Cited

U.S. PATENT DOCUMENTS

| | | | |
|---|---|---|---|
| 7,485,685 B2 | 2/2009 | Mihan et al. |
| 7,513,677 B2 | 4/2009 | Gneuss et al. |
| 7,594,453 B2 | 9/2009 | Blach |
| 7,628,892 B2 | 12/2009 | Fini |
| 7,647,886 B2 | 1/2010 | Kubista et al. |
| 7,654,725 B2 | 2/2010 | Sturm et al. |
| 7,700,015 B2 | 4/2010 | Kern et al. |
| 7,744,788 B2 | 6/2010 | Portier et al. |
| 7,799,835 B2 | 9/2010 | Smith et al. |
| 7,828,538 B2 | 11/2010 | Fellinger |
| 7,902,262 B2 | 3/2011 | Armstrong et al. |
| 7,928,150 B2 | 4/2011 | Kannan et al. |
| 7,935,737 B2 | 5/2011 | Gopal et al. |
| 7,980,834 B2 | 7/2011 | Maguire |
| 8,080,190 B2 | 12/2011 | Ichikawa et al. |
| 8,147,738 B2 | 4/2012 | Boczon et al. |
| 8,187,512 B2 | 5/2012 | Eloo et al. |
| 8,398,752 B2 | 3/2013 | Brownstein et al. |
| 8,404,755 B2 | 3/2013 | Sequeira |
| 8,444,886 B2 | 5/2013 | Herve |
| 8,471,972 B2 | 6/2013 | Tsubata |
| 8,557,155 B2 | 10/2013 | Deiss et al. |
| 8,597,553 B1 | 12/2013 | Clark |
| 8,735,457 B2 | 5/2014 | Booth et al. |
| 8,741,972 B2 | 6/2014 | Booth et al. |
| 8,795,811 B2 | 8/2014 | Cloutier et al. |
| 9,061,442 B2 | 6/2015 | Gneuss et al. |
| 9,149,955 B2 | 10/2015 | Bower et al. |
| 9,168,718 B2 | 10/2015 | Westwood et al. |
| 9,409,363 B2 | 8/2016 | Clark |
| 9,550,338 B2 | 1/2017 | Clark |
| 9,630,353 B2 | 4/2017 | Clark |
| 9,630,354 B2 | 4/2017 | Clark |
| 9,636,845 B2 | 5/2017 | Clark |
| 9,636,860 B2 | 5/2017 | Clark |
| 9,908,263 B2 | 3/2018 | Pichler et al. |
| 9,975,278 B2 | 5/2018 | Rabiser et al. |
| 10,124,513 B2 | 11/2018 | Clark |
| 10,532,495 B2 | 1/2020 | Clark |
| 2002/0086077 A1 | 7/2002 | Noller et al. |
| 2004/0053047 A1 | 3/2004 | Jackson et al. |
| 2004/0063860 A1 | 4/2004 | Marston et al. |
| 2004/0082672 A1 | 4/2004 | Zeng et al. |
| 2004/0140248 A1 | 7/2004 | Dauzvardis et al. |
| 2004/0155374 A1 | 8/2004 | Hutchinson et al. |
| 2005/0047267 A1* | 3/2005 | Gneuss ............... B29C 48/435 366/83 |
| 2005/0263941 A1 | 12/2005 | Reutter et al. |
| 2006/0012074 A1 | 1/2006 | Booth et al. |
| 2006/0076705 A1 | 4/2006 | Fowler et al. |
| 2006/0284334 A1 | 12/2006 | Christel |
| 2007/0000947 A1 | 1/2007 | Lewis et al. |
| 2007/0009750 A1 | 1/2007 | Ito et al. |
| 2007/0052131 A1 | 3/2007 | Fujimaki et al. |
| 2007/0261777 A1 | 11/2007 | Steckelberg et al. |
| 2008/0004202 A1 | 1/2008 | Wolfgang et al. |
| 2008/0069916 A1 | 3/2008 | Regalia |
| 2008/0139700 A1* | 6/2008 | Roden .................. B29C 48/12 523/340 |
| 2008/0157425 A1 | 7/2008 | Rodgers et al. |
| 2008/0214701 A1 | 9/2008 | Wilms et al. |
| 2008/0272508 A1 | 11/2008 | Culbert et al. |
| 2008/0274320 A1* | 11/2008 | Yokoyama ........... C08G 63/183 428/36.92 |
| 2008/0292831 A1 | 11/2008 | Juriga et al. |
| 2009/0004325 A1 | 1/2009 | Bacher et al. |
| 2009/0039542 A1* | 2/2009 | Morton-Finger ....... B29C 48/08 264/176.1 |
| 2009/0270564 A1 | 10/2009 | Gorlier et al. |
| 2009/0286919 A1 | 11/2009 | Moeller et al. |
| 2010/0102475 A1 | 4/2010 | Moon et al. |
| 2010/0113626 A1 | 5/2010 | Liu |
| 2010/0152309 A1* | 6/2010 | Booth .................. D01D 1/065 521/40.5 |
| 2011/0177283 A1 | 7/2011 | Juriga |
| 2011/0257345 A1 | 10/2011 | Hoover, Jr. et al. |
| 2012/0070615 A1 | 3/2012 | Shi et al. |
| 2012/0279023 A1 | 11/2012 | Burout et al. |
| 2013/0133697 A1 | 5/2013 | Stockman et al. |
| 2015/0069652 A1 | 3/2015 | Clark |
| 2015/0069655 A1 | 3/2015 | Clark |
| 2015/0076725 A1 | 3/2015 | Clark |
| 2015/0076744 A1 | 3/2015 | Clark |
| 2017/0136761 A1 | 5/2017 | Sieradzki et al. |
| 2017/0152611 A1 | 6/2017 | Clark |
| 2017/0275785 A1 | 9/2017 | Williams et al. |
| 2018/0126595 A1 | 5/2018 | Clark |
| 2018/0362723 A1 | 12/2018 | Gneuss et al. |
| 2020/0055213 A1 | 2/2020 | Clark |

FOREIGN PATENT DOCUMENTS

| | | |
|---|---|---|
| CH | 170967 A | 8/1934 |
| CN | 101444954 | 6/2009 |
| CN | 101778705 | 7/2010 |
| CN | 201872322 | 6/2011 |
| CN | 202072825 | 12/2011 |
| CN | 102990903 | 3/2013 |
| CN | 202986059 U | 6/2013 |
| CN | 104040040 | 9/2014 |
| CN | 204265905 | 4/2015 |
| DE | 2243024 A1 | 3/1973 |
| DE | 4433593 | 6/1995 |
| DE | 19722278 | 12/1998 |
| DE | 102006033089 | 10/2007 |
| DE | 102008018686 | 10/2009 |
| DE | 102011082769 | 3/2013 |
| DE | 102013000316 | 7/2014 |
| DE | 102017111275 | 11/2018 |
| EP | 0336520 | 10/1989 |
| EP | 0846860 A2 | 6/1998 |
| EP | 0881054 | 12/1998 |
| EP | 1054083 | 11/2000 |
| EP | 1400332 | 3/2004 |
| EP | 1434680 B1 | 7/2006 |
| EP | 2748358 | 7/2014 |
| EP | 3375916 | 9/2018 |
| GB | 2141844 | 1/1985 |
| JP | 63191823 | 8/1988 |
| JP | 2003530478 | 10/2003 |
| WO | 2001021373 | 3/2001 |
| WO | 2002038276 | 5/2002 |
| WO | 2003033240 | 4/2003 |
| WO | 2004/026557 | 4/2004 |
| WO | 2008017843 | 2/2008 |
| WO | 2008083820 | 7/2008 |
| WO | 2010133531 | 11/2010 |
| WO | 2011088437 | 7/2011 |
| WO | 2011095361 | 8/2011 |
| WO | 2012119165 | 9/2012 |
| WO | 2013180941 | 12/2013 |
| WO | 2016081474 | 5/2016 |
| WO | 2016081495 | 5/2016 |
| WO | 2016081508 | 5/2016 |
| WO | 2016081568 | 5/2016 |
| WO | 2018089346 | 5/2018 |
| WO | 2018140884 | 8/2018 |
| WO | 2018161021 | 9/2018 |

OTHER PUBLICATIONS

"Processing Technology: Processing of Polymer Melts," Oct. 31, 2007, Gneuss Kunststofftechnik GmbH, Dusseldorf, Germany.
Australian Office Action, dated Aug. 26, 2015, from corresponding Australian Patent Application No. 2014215998.
Australian Office Action, dated Dec. 5, 2016, from corresponding Australian Patent Application No. 2016234917.
Australian Office Action, dated May 9, 2014, from corresponding Australian Patent Application No. 2013267847.
Chinese Office Action, dated May 12, 2016, from corresponding Chinese Patent Application No. 201380003461.8.

(56) References Cited

OTHER PUBLICATIONS

Chinese Office Action, dated Sep. 14, 2015, from corresponding Chinese Patent Application No. 201380003461.8.
Decision of Patent Grant, dated Dec. 12, 2014, from corresponding Korean Patent Application No. 10-2014-7016621.
European Office Action, dated Dec. 12, 2016, from corresponding European Patent Application No. 15158377.0.
Ex Parte Quayle Action, dated Mar. 11, 2019, from corresponding U.S. Appl. No. 16/220,733.
Extended European Search Report, dated Aug. 26, 2015, from corresponding European Application No. 15158377.0.
Extended European Search Report, dated Jul. 24, 2018, from corresponding European Patent Application No. 18170112.9.
Final Office Action, dated Dec. 24, 2015, from corresponding U.S. Appl. No. 14/256,261.
Final Office Action, dated May 22, 2019, from corresponding U.S. Appl. No. 15/396,143.
Final Office Action, dated Oct. 19, 2016, from corresponding U.S. Appl. No. 14/546,819.
Final Office Action, dated Oct. 19, 2016, from corresponding U.S. Appl. No. 14/546,837.
Final Office Action, dated Oct. 19, 2016, from corresponding U.S. Appl. No. 14/546,847.
Final Office Action, dated Oct. 20, 2016, from corresponding U.S. Appl. No. 14/546,796.
Gneuss M: "Multi Rotation System Extruder Leads to Breakthrough in Polymer Evacuation", International Fiber Journal, International Media Group, Charlotte, NC, US, vol. 23, No. 1, Feb. 1, 2008 (Feb. 1, 2008), pp. 40-41, XP001514827, ISSN: 1049-801X the whole document.
Hannemann, Innovative Aufbereitungslösung für PET mit uneingeschränkter FDA—Lebensmittelzulassung, Presentation, Mar. 15, 2012, 37 pages total, Gneuss Kunststofftechnik GmbH, Germany.
International Preliminary Report on Patentability, dated Dec. 11, 2014, from corresponding International Application No. PCT/US2013/040753.
International Preliminary Report on Patentability, dated Dec. 2, 2014, from corresponding International Application No. PCT/US2013/040753.
International Preliminary Report on Patentability, dated Jun. 1, 2017, from corresponding International Application No. PCT/US2015/061116.
International Preliminary Report on Patentability, dated Jun. 1, 2017, from corresponding International Application No. PCT/US2015/061145.
International Preliminary Report on Patentability, dated Jun. 1, 2017, from corresponding International Application No. PCT/US2015/061174.
International Preliminary Report on Patentability, dated Jun. 1, 2017, from corresponding International Application No. PCT/US2015/061288.
International Search Report, dated Apr. 12, 2018, from corresponding International Application No. PCT/US2018/015751.
International Search Report, dated Feb. 2, 2016, from corresponding International Application No. PCT/US2015/061116.
International Search Report, dated Feb. 2, 2016, from corresponding International Application No. PCT/US2015/061145.
International Search Report, dated Feb. 5, 2016, from corresponding International Application No. PCT/US2015/061174.
International Search Report, dated Jan. 20, 2016, from corresponding International Application No. PCT/US2015/061288.
International Search Report, dated Mar. 1, 2018, from corresponding International Application Serial No. PCT/US2017/060359.
International Search Report, dated Nov. 19, 2018, from corresponding International Application No. PCT/US2018/051043.
International Search Report, dated Sep. 2, 2013, from corresponding International Application No. PCT/US2013/040753.
Invitation to Pay Additional Search Fees, dated Jan. 5, 2018, from corresponding International Application Serial No. PCT/US2017/060359.
Jaecker M: "The Conceptual Concept of the Future // Advantages of the Negative-Conical Gangti EFE on Double-Screw Extruders", Kunststoffe, Carl Hanser Verlag, Munchen, DE, vol. 99, No. 12, Dec. 1, 2000 (2000-12-91), p. 64,66, XP990976191, ISSN: 9923-5563, figure 1.
Korean Office Action, dated Aug. 18, 2014, from corresponding Korean Patent Application No. 10-2014-7016621.
Notice of Acceptance, dated Jun. 21, 2016, from corresponding Australian Patent Application No. 2014215998.
Notice of Acceptance, dated Nov. 10, 2014, from corresponding Australian Patent Application No. 2013267847.
Notice of Allowance, dated Apr. 13, 2016, from corresponding U.S. Appl. No. 14/256,261.
Notice of Allowance, dated Apr. 17, 2019, from corresponding U.S. Appl. No. 16/220,733.
Notice of Allowance, dated Aug. 1, 2019, from corresponding U.S. Appl. No. 15/396,143.
Notice of Allowance, dated Dec. 13, 2018, from corresponding U.S. Appl. No. 15/473,385.
Notice of Allowance, dated Feb. 2, 2017, from corresponding U.S. Appl. No. 14/546,819.
Notice of Allowance, dated Feb. 2, 2017, from corresponding U.S. Appl. No. 14/546,837.
Notice of Allowance, dated Feb. 2, 2017, from corresponding U.S. Appl. No. 14/546,847.
Notice of Allowance, dated Feb. 3, 2017, from corresponding U.S. Appl. No. 14/546,796.
Notice of Allowance, dated Jan. 24, 2019, from corresponding U.S. Appl. No. 15/473,402.
Notice of Allowance, dated Jul. 5, 2018, from corresponding U.S. Appl. No. 15/204,645.
Notice of Allowance, dated May 1, 2019, from corresponding U.S. Appl. No. 15/419,955.
Office Action, dated Aug. 26, 2019, from corresponding U.S. Appl. No. 16/220,905.
Notice of Allowance, dated Oct. 28, 2013, from corresponding U.S. Appl. No. 13/721,955.
Notice of Allowance, dated Sep. 12, 2016, from corresponding U.S. Appl. No. 13/892,713.
Notice of Opposition, dated Dec. 17, 2015, from corresponding European Application No. 13728264.6.
Office Action, dated Apr. 9, 2018, from corresponding U.S. Appl. No. 15/204,645.
Office Action, dated Aug. 21, 2015, from corresponding U.S. Appl. No. 14/256,261.
Office Action, dated Aug. 27, 2018, from corresponding U.S. Appl. No. 15/473,385.
Office Action, dated Aug. 27, 2018, from corresponding U.S. Appl. No. 15/473,402.
Office Action, dated Jul. 23, 2019, from corresponding U.S. Appl. No. 16/041,442.
Office Action, dated Jun. 1, 2016, from corresponding U.S. Appl. No. 14/546,837.
Office Action, dated Jun. 10, 2013, from corresponding U.S. Appl. No. 13/721,955.
Office Action, dated Jun. 13, 2016, from corresponding U.S. Appl. No. 14/546,847.
Office Action, dated Jun. 18, 2019, from corresponding U.S. Appl. No. 16/402,583.
Office Action, dated Jun. 22, 2016, from corresponding U.S. Appl. No. 14/546,796.
Office Action, dated Jun. 30, 2016, from corresponding U.S. Appl. No. 13/892,740.
Office Action, dated Mar. 24, 2016, from corresponding U.S. Appl. No. 13/892,713.
Office Action, dated May 26, 2016, from corresponding U.S. Appl. No. 14/546,819.
Office Action, dated May 6, 2019, from corresponding U.S. Appl. No. 15/348,591.

(56) References Cited

OTHER PUBLICATIONS

Office Action, dated Oct. 9, 2018, from corresponding U.S. Appl. No. 15/419,955.
Office Action, dated Sep. 7, 2018, from corresponding U.S. Appl. No. 15/396,143.
Restriction Requirement, dated Apr. 30, 2013, from corresponding U.S. Appl. No. 13/721,955.
Restriction Requirement, dated Feb. 5, 2019, from corresponding U.S. Appl. No. 16/220,733.
Restriction Requirement, dated Jul. 15, 2019, from corresponding U.S. Appl. No. 16/432,579.
Schiefer,Process Engineering, Rowohlt Taschenbuch Verlag GmbH, Aug. 1972.
Vietnamese Office Action, dated Jul. 13, 2016, from corresponding Vietnamese Patent Application No. 1-2014-01079.
Wikipedia, Polyethylene terephthalate, https://en.wikipedia.org/w/index.php?title=Polyethylene_terephthalate&oldid=491494734.
Written Opinion of the International Searching Authority, dated Apr. 12, 2018, from corresponding International Application No. PCT/US2018/015751.
Written Opinion of the International Searching Authority, dated Feb. 2, 2016, from corresponding International Application No. PCT/US2015/061116.
Written Opinion of the International Searching Authority, dated Feb. 2, 2016, from corresponding International Application No. PCT/US2015/061145.
Written Opinion of the International Searching Authority, dated Feb. 5, 2016, from corresponding International Application No. PCT/US2015/061174.
Written Opinion of the International Searching Authority, dated Jan. 20, 2016, from corresponding International Application No. PCT/US2015/061288.
Written Opinion of the International Searching Authority, dated Mar. 1, 2018, from corresponding International Application Serial No. PCT/US2017/060359.
Written Opinion of the International Searching Authority, dated Nov. 19, 2018, from corresponding International Application No. PCT/US2018/051043.
Written Opinion of the International Searching Authority, dated Sep. 2, 2013, from corresponding International Application No. PCT/US2013/040753.
Office Action, dated Aug. 8, 2019, from corresponding U.S. Appl. No. 16/409,599.
International Preliminary Report on Patentability, dated Aug. 8, 2019, from corresponding International Application No. PCT/US2018/015751.
Office Action, dated Aug. 13, 2019, from corresponding U.S. Appl. No. 16/213,694.
Botos, J., et al., "Color Measurement of Plastics—from Compounding via Pelletizing, up to Injection Molding and Extrusion," AIP Conference Proceedings 1593, 16 (2014), https://doi.org/10.1063/1.4873725, Feb. 17, 2015.
Machado, Almir De Souza, "Fundamentals of Cast Film Extrusion Technology," https://www.slideshare.net/ASMachado/fundamentals-of-cast-film-extrusion-technology, Dec. 2, 2013.
Notice of Allowance, dated Aug. 19, 2019, from corresponding U.S. Appl. No. 16/402,583.
International Preliminary Report on Patentability, dated Sep. 12, 2019, from corresponding International Application No. PCT/US2018/020746.
Office Action, dated Sep. 12, 2019, from corresponding U.S. Appl. No. 16/432,579.
Notice of Allowance, dated Oct. 10, 2019, from corresponding U.S. Appl. No. 16/432,579.
Notice of Allowance, dated Apr. 29, 2020, from corresponding U.S. Appl. No. 15/348,591.
Office Action, dated May 27, 2020, from corresponding U.S. Appl. No. 16/131,397.
Final Office Action, dated Jan. 9, 2020, from corresponding U.S. Appl. No. 15/348,591.
International Search Report, dated Dec. 10, 2019, from corresponding International Application No. PCT/US2019/042458.
Office Action, dated Jan. 29, 2020, from corresponding U.S. Appl. No. 16/684,490.
Written Opinion of the International Searching Authority, dated Dec. 10, 2019, from corresponding International Application No. PCT/US2019/042458.
Notice of Allowance, dated Feb. 3, 2020, from corresponding U.S. Appl. No. 16/041,442.
Austrian Patent Application No. A 330/2011, filed Mar. 10, 2011, entitled "Verfahren und Vorrichtung zum Entfernen von Verunreinigungen aus einer Kunststoffschmelze".
International Search Report, dated Jul. 5, 2012, from corresponding International Application No. PCT/AT2012/000052.
Office Action, dated Dec. 2, 2019, from corresponding U.S. Appl. No. 16/664,730.
Office Action, dated Nov. 25, 2019, from corresponding U.S. Appl. No. 15/804,501.
Notice of Allowance, dated Feb. 12, 2020, from corresponding U.S. Appl. No. 16/220,905.
Office Action, dated Feb. 21, 2020, from corresponding U.S. Appl. No. 15/910,853.
Notice of Allowance, dated Feb. 28, 2020, from corresponding U.S. Appl. No. 16/664,730.
Notice of Allowance, dated Mar. 3, 2020, from corresponding U.S. Appl. No. 16/213,694.
Office Action, dated Sep. 1, 2020, from corresponding U.S. Appl. No. 16/537,844.
European Search Report, dated Apr. 28, 2020, from corresponding European Application No. 17869117.6.
Final Office Action, dated Sep. 28, 2020, from corresponding U.S. Appl. No. 16/131,397.
Office Action, dated Oct. 27, 2020, from corresponding U.S. Appl. No. 16/409,599.
Restriction Requirement, dated Oct. 20, 2020, from corresponding U.S. Appl. No. 16/480,302.
Final Office Action, dated Jul. 8, 2020, from corresponding U.S. Appl. No. 15/910,853.
Restriction Requirement, dated Jul. 1, 2020, from corresponding U.S. Appl. No. 16/041,586.
Final Office Action, dated Jun. 11, 2020, from corresponding U.S. Appl. No. 15/804,501.
Final Office Action, dated Jun. 11, 2020, from corresponding U.S. Appl. No. 16/409,599.
Gneuss website, https://www.gneuss.com/en/polymer-technologies/extrusion/mrs-extruder/, dated Jun. 5, 2020, pp. 1-4.
Office Action, dated Jun. 24, 2020, from corresponding U.S. Appl. No. 16/348,117.
International Search Report, dated Sep. 3, 2020, from corresponding International Application No. PCT/US2020/036094.
Written Opinion of the International Searching Authority, dated Sep. 3, 2020, from corresponding International Application No. PCT/US2020/036094.
Office Action, dated Nov. 2, 2020, from corresponding U.S. Appl. No. 15/804,501.
Office Action, dated Nov. 18, 2020, from corresponding U.S. Appl. No. 16/664,724.
International Preliminary Report on Patentability, dated Feb. 4, 2021, from corresponding International Application No. PCT/US2019/042456.
International Preliminary Report on Patentability, dated Feb. 4, 2021, from corresponding International Application No. PCT/US2019/042458.
Office Action, dated Feb. 12, 2021, from corresponding U.S. Appl. No. 16/480,302.
Advisory Action, dated Apr. 9, 2021, from corresponding U.S. Appl. No. 16/348,117.
Final Office Action, dated Apr. 27, 2021, from corresponding U.S. Appl. No. 15/910,853.
Office Action, dated May 4, 2021, from corresponding U.S. Appl. No. 16/409,599.
Restriction Requirement, dated May 17, 2021, from corresponding U.S. Appl. No. 16/514,898.

(56) References Cited

OTHER PUBLICATIONS

Final Office Action, dated May 25, 2021, from corresponding U.S. Appl. No. 16/480,302.
Notice of Allowance, dated Feb. 25, 2021, from corresponding U.S. Appl. No. 16/664,724.
Office Action, dated Mar. 1, 2021, from corresponding U.S. Appl. No. 16/131,397.
Office Action, dated Dec. 17, 2020, from corresponding U.S. Appl. No. 15/910,853.
Final Office Action, dated Dec. 31, 2020, from corresponding U.S. Appl. No. 16/348,117.
Notice of Allowance, dated Jan. 13, 2021, from corresponding U.S. Appl. No. 16/537,844.
International Preliminary Report on Patentability, dated Mar. 26, 2020, from corresponding International Application No. PCT/US2018/051043.
Notice of Allowance, dated Apr. 9, 2020, from corresponding U.S. Appl. No. 16/684,490.
Office Action, dated Jun. 18, 2021, from corresponding U.S. Appl. No. 16/348,117.
Office Action, dated Jun. 2, 2021, from corresponding U.S. Appl. No. 16/514,903.
Office Action, dated Jun. 25, 2021, from corresponding U.S. Appl. No. 16/489,875.
Office Action, dated Jun. 25, 2021, from corresponding U.S. Appl. No. 16/816,409.
Final Office Action, dated Jul. 30, 2021, from corresponding U.S. Appl. No. 15/910,853.
Office Action, dated Aug. 6, 2021, from corresponding U.S. Appl. No. 16/518,261.
Final Office Action, dated Sep. 7, 2021, from corresponding U.S. Appl. No. 16/131,397.
Office Action, dated Sep. 2, 2021, from corresponding U.S. Appl. No. 16/645,137.

\* cited by examiner

SYSTEMS AND METHODS FOR MANUFACTURING BULKED CONTINUOUS FILAMENT

CROSS REFERENCE TO RELATED APPLICATIONS

This application is a divisional of U.S. patent application Ser. No. 16/432,579, filed Jun. 5, 2019, entitled "Systems and Methods For Manufacturing Bulked Continuous Filament From Colored Recycled PET", which is a continuation-in-part of U.S. patent application Ser. No. 16/220,733, filed Dec. 14, 2018, entitled "Methods for Manufacturing Bulked Continuous Filament from Recycled PET", which is a continuation-in-part of U.S. patent application Ser. No. 15/419,955, filed Jan. 30, 2017, entitled "Methods for Manufacturing Bulked Continuous Filament from Colored Recycled PET", which is a continuation-in-part of U.S. patent application Ser. No. 15/396,143, filed Dec. 30, 2016, entitled "Systems and Methods for Manufacturing Bulked Continuous Filament", which is a continuation of U.S. patent application Ser. No. 13/892,713, filed May 13, 2013, now U.S. Pat. No. 9,550,338, issued Jan. 24, 2017, entitled "Systems and Methods for Manufacturing Bulked Continuous Filament", which is a divisional of U.S. patent application Ser. No. 13/721,955, filed Dec. 20, 2012, now U.S. Pat. No. 8,597,553, issued Dec. 3, 2013, entitled "Systems and Methods for Manufacturing Bulked Continuous Filament", which claimed priority from U.S. Provisional Patent Application No. 61/654,016, filed May 31, 2012, entitled "Systems and Methods for Manufacturing Bulked Continuous Fiber," all of which are hereby incorporated herein by reference in their entirety.

BACKGROUND

Because pure virgin polyethylene terephthalate (PET) polymer is more expensive than recycled PET polymer, and because of the environmental benefits associated with using recycled polymer, it would be desirable to be able to produce bulked continuous carpet filament, and other items, from 100% recycled PET polymer (e.g., PET polymer from post-consumer PET bottles).

SUMMARY

Various embodiments are directed to methods and systems for manufacturing bulked continuous carpet filament from recycled PET. In particular embodiments, the disclosed systems may include a melt processing unit having a first section configured to melt a plurality of polymer flakes to create a first single stream of polymer melt and to provide the first single stream of polymer melt to a separation element. The separation element may be configured to receive the first single stream of polymer melt and to separate the first single stream of polymer melt into multiple streams of polymer melt. A multiple stream section of the melt processing unit may be configured to receive the multiple streams of polymer melt from the separation element, expose the multiple streams of polymer melt to a pressure of the multiple stream section of the melt processing unit, and allow the multiple streams of polymer melt to fall into a receiving section of the melt processing unit. A pressure regulation system may be configured to reduce the pressure of the multiple stream section of the melt processing unit to between about 0 millibars and about 5 millibars, and to maintain the pressure within the multiple stream section within this pressure range as the multiple streams of polymer melt pass through the multiple stream section. The receiving section of the melt processing unit may be configured to receive the multiple streams of polymer melt, recombine the multiple streams of polymer melt into a second single stream of polymer melt, and provide the second single stream of polymer melt to one or more spinning machines that are configured to form the second single stream of polymer melt into bulked continuous carpet filament.

In particular embodiments, the disclosed methods may include melting a plurality of polymer flakes to create a first single stream of polymer melt and routing the first single stream of polymer melt through a separation element to generate multiple streams of polymer melt. The multiple streams of polymer melt may be exposed to a pressure within a multiple stream section of a melt processing unit, where the pressure of the multiple stream section of the melt processing unit may be between about 0 millibars and about 5 millibars. The multiple streams of polymer melt may be allowed to fall through the multiple stream section of the melt processing unit into a receiving section of the melt processing unit where the multiple streams of polymer melt may be recombined into a second single stream of polymer melt. The second single stream of polymer melt may be provided to one or more spinning machines that are configured to form polymer from the second single stream of polymer melt into bulked continuous carpet filament.

Various embodiments are also described in the following listing of concepts:

1. A system for manufacturing bulked continuous carpet filament, the system comprising:

a first section of a melt processing unit, the first section being configured to melt a plurality of polymer flakes to create a first single stream of polymer melt;

a separation element configured to receive the first single stream of polymer melt and divide the first single stream of polymer melt into multiple streams of polymer melt;

a multiple stream section of the melt processing unit configured to:

receive the multiple streams of polymer melt, allow the multiple streams of polymer melt to pass through the multiple stream section and into a receiving section of the melt processing unit, and expose the multiple streams of polymer melt to a pressure within the multiple stream section of the melt processing unit as the multiple streams of polymer melt pass through the multiple stream section of the melt processing unit; and a pressure regulation system configured to maintain the pressure within the multiple stream section of the melt processing unit between about 0 millibars and about 5 millibars as the multiple streams of polymer pass through the multiple stream section, wherein:

the receiving section of the melt processing unit is configured to:

receive the multiple streams of polymer melt, recombine the multiple streams of polymer melt into at least one combined stream of polymer melt, and convey the at least one combined stream of polymer melt toward at least one spinning machine that is configured to form polymer from the at least one combined stream of polymer melt into bulked continuous carpet filament.

2. The system of Concept 1, wherein:

the system further comprises a crystallizer configured to perform a crystallization step on the plurality of polymer flakes prior to melting the plurality of polymer flakes in the first section of the melt processing unit; and the multiple stream section of the melt processing unit is configured to allow the multiple streams of polymer melt to fall into a receiving section of the melt processing unit under the weight of gravity.

3. The system of Concept 2, wherein the receiving section of the melt processing unit comprises a particular extruder that is adapted to recombine the multiple streams of polymer melt into the at least one combined stream of polymer melt.

4. The system of Concept 3, wherein the particular extruder is disposed vertically below the separation element.

5. The system of Concept 4, wherein the separation element is adapted to divide the first single stream of polymer melt into at least 8 streams of polymer melt.

6. The system of Concept 5, wherein:

the separation element is adapted to divide the first single stream of polymer melt into at least 100 streams of polymer melt; and the multiple stream section is configured to expose each of the at least 100 streams of polymer melt to a pressure of between about 0 mbar and about 5 mbar as the at least 100 streams of polymer melt pass through the multiple stream section of the melt processing unit.

7. The system of Concept 6, wherein the multiple stream section is configured to expose each of the at least 100 streams of polymer melt to a pressure of between about 0 mbar and about 1.5 mbar as the at least 100 streams of polymer melt pass through the multiple stream section of the melt processing unit.

8. The system of Concept 1, wherein the pressure regulation system is configured to reduce the pressure within the multiple stream section of the melt processing unit to between about 0.5 millibars and about 1.2 millibars, and to maintain the pressure within the multiple stream section of the melt processing unit between about 0.5 millibars and about 1.2 millibar while the multiple streams of polymer melt pass through the multiple stream section of the melt processing unit.

9. The system of Concept 1, further comprising an intrinsic viscosity management system configured to determine an intrinsic viscosity of the at least one combined stream of polymer melt, and, in response to determining the intrinsic viscosity of the at least one combined stream of polymer melt, instructing the pressure regulation system to adjust the pressure within the multiple stream section of the melt processing unit.

10. The system of Concept 1, wherein the system is further adapted for reducing post-consumer recycled polymer material into the plurality of polymer flakes and cleansing the plurality of polymer flakes before melting the polymer flakes.

11. The system of Concept 1, wherein the separation element is an extrusion die defining a plurality of holes, each of the holes creating a respective one of the multiple streams of polymer melt.

12. The system of Concept 1, wherein:

the first section of the melt processing unit comprises a single screw extruder; and the receiving section of the melt processing unit comprises a single screw extruder.

13. The system of Concept 1, wherein the plurality of polymer flakes is derived, at least in part, from polyethylene terephthalate (PET) flakes that are derived from recycled PET bottles.

14. The system of Concept 1, wherein:

the first section of the melt processing unit is a first extrusion means;

the separation element is a polymer melt separation means;

the multiple stream section of the melt processing unit is a second extrusion means;

the pressure regulation system is a pressure regulation means; and the receiving section of the melt processing unit is a third extrusion means.

15. A method of manufacturing bulked continuous carpet filament, the method comprising:

melting a plurality of polymer flakes to create a first stream of polymer melt;

routing the first stream of polymer melt through a separation element to generate multiple streams of polymer melt;

exposing the multiple streams of polymer melt to a pressure within a multiple stream section of a melt processing unit to a pressure between about 0 millibars and about 5 millibars;

while maintaining the pressure of the multiple stream section of the melt processing unit between about 0 millibars and about 5 millibars allowing the multiple streams of polymer melt to pass through the multiple stream section of the melt processing unit into a receiving section of the melt processing unit;

recombining the multiple streams of polymer melt into at least one stream of polymer melt at the receiving section of the melt processing unit; and providing polymer from the at least one stream of polymer melt to at least one spinning machine configured to form the polymer from the at least one stream of polymer melt into bulked continuous carpet filament.

16. The method of Concept 15, wherein the separation element comprises an extruder having at least eight satellite screws and each of the at least eight satellite screws is respectively dimensioned to produce one of the multiple streams of polymer melt from polymer from the first stream of polymer melt.

17. The method of Concept 15, wherein allowing the multiple streams of polymer melt to pass through the multiple stream section of the melt processing unit into a receiving section of the melt processing unit comprises allowing the multiple streams of polymer melt to fall through the multiple stream section of the melt processing unit under the weight of gravity.

18. The method of Concept 17, wherein exposing the multiple streams of polymer melt to the pressure within the multiple stream section of a melt processing unit comprises exposing a surface area of each of the multiple streams of polymer melt to the pressure within the multiple stream section of the melt processing unit.

19. The method of Concept 17, wherein the pressure within the multiple stream section of the melt processing unit has been selected to produce a desired intrinsic viscosity associated with the at least one stream of polymer melt.

20. The method of Concept 19, further comprising determining an intrinsic viscosity of the at least one stream of polymer melt, and, in response to determining the intrinsic viscosity of the at least one stream of polymer melt, adjusting the pressure within the multiple stream section of the melt processing unit.

21. The method of Concept 20, wherein maintaining the pressure of the multiple stream section of the melt processing unit between about 0 millibars and about 5 millibars comprises maintaining the pressure of the multiple stream section of the melt processing unit between about 0 millibars and about 1.5 millibars.

22. The method of Concept 15, wherein maintaining the pressure of the multiple stream section of the melt processing unit between about 0 millibars and about 5 millibars comprises maintaining the pressure of the multiple stream section of the melt processing unit between about 0 millibars and about 1.5 millibars.

23. The method of Concept 15, wherein the multiple streams of polymer melt comprise at least 100 streams of polymer melt.

24. The method of Concept 15, wherein the separation element comprises a plate defining a plurality of holes that are each respectively dimensioned to produce one of the multiple streams of polymer melt from polymer from the first stream of polymer melt.

25. The method of Concept 15, further comprising:
determining that an intrinsic viscosity of the at least one stream of polymer melt is below a predetermined level; and
in response to determining that the intrinsic viscosity of the at least one stream of polymer melt is below the predetermined level, substantially automatically reducing the pressure of the multiple stream section of the melt processing unit.

26. The method of Concept 15, wherein the plurality of polymer flakes is derived, at least in part, from polyethylene terephthalate (PET) flakes that are derived from recycled PET containers.

27. The method of Concept 15, wherein exposing the multiple streams of polymer melt to the pressure within the multiple stream section of the melt processing unit comprises simultaneously exposing the multiple streams of polymer melt to the pressure within the multiple stream section of the melt processing unit while the multiple streams of polymer melt fall through the multiple stream section of the melt processing unit into the receiving section of the melt processing unit.

28. The method of Concept 27, wherein recombining the multiple streams of polymer melt into the at least one stream of polymer melt at the receiving section of the melt processing unit comprises recombining the multiple streams of polymer melt into the at least one stream of polymer melt using a single screw extruder.

29. A system for manufacturing bulked continuous carpet filament, the system comprising:
means for melting a plurality of polymer flakes to create a first stream of polymer melt;
means for routing the first stream of polymer melt through a separation element to generate multiple streams of polymer melt;
means for exposing the multiple streams of polymer melt to a pressure within a multiple stream section of a melt processing unit;
means for reducing the pressure of the multiple stream section of the melt processing unit to between about 0 millibars and about 5 millibars;
means for, while maintaining the pressure of the multiple stream section of the melt processing unit between about 0 millibars and about 5 millibars, allowing the multiple streams of polymer melt to pass through the multiple stream section of the melt processing unit into a receiving section of the melt processing unit;
means for recombining the multiple streams of polymer melt into at least one stream of polymer melt at the receiving section of the melt processing unit; and
means for providing polymer from the at least one stream of polymer melt to at least one spinning machine configured to form the polymer from the at least one stream of polymer melt into bulked continuous carpet filament.

30. The system of Concept 29, wherein allowing the multiple streams of polymer melt to pass through the multiple stream section of the melt processing unit into a receiving section of the melt processing unit comprises allowing the multiple streams of polymer melt to fall through the multiple stream section of the melt processing unit under the weight of gravity.

BRIEF DESCRIPTION OF THE DRAWINGS

Having described various embodiments in general terms, reference will now be made to the accompanying drawings, which are not necessarily drawn to scale, and wherein.

DETAILED DESCRIPTION OF VARIOUS EMBODIMENTS

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

New processes and systems for making fiber from recycled polymer (e.g., recycled PET polymer) are described below. In various embodiments, these new processes and systems may be more effective in removing contaminants and/or water from recycled polymer than earlier processes. Various disclosed embodiments may also not require that polymer be melted and cooled as many times as required by current processes and systems. In at least one embodiment, the improved processes and systems may result in a recycled PET polymer of high enough quality to be used in producing bulked continuous carpet filament from 100% recycled PET content (e.g., 100% from PET obtained from previously-used PET bottles). In at least one embodiment, the improved processes and systems may result in a recycled PET polymer of high enough quality to be used in producing bulked continuous carpet filament from at least 50% recycled PET content. In particular embodiments, the recycled PET polymer may have an intrinsic viscosity of at least about 0.79 dL/g (e.g., of between about 0.79 dL/g and about 1.00 dL/g).

Flake Preparation Process

A BCF (bulked continuous filament) manufacturing process, according to a particular embodiment, may include performing one or more of the following steps: (1) acquisition, sorting, and initial cleaning of source material comprising PET polymer (e.g., post-consumer polymer bottles, such as post-consumer PET bottles); (2) granulating or otherwise reducing the source material into flakes; (3) preparing (e.g., cleaning and/or sorting) the flakes for use in the process; (4) passing the prepared flakes through an extruder that melts the flakes and purifies the resulting PET polymer; and (5) feeding the purified polymer into one or more spinning machines that turn the polymer into filament for use in manufacturing carpets. These steps, and other aspects that may be integrated into various disclosed embodiments, are described in greater detail below.

Figure 1:
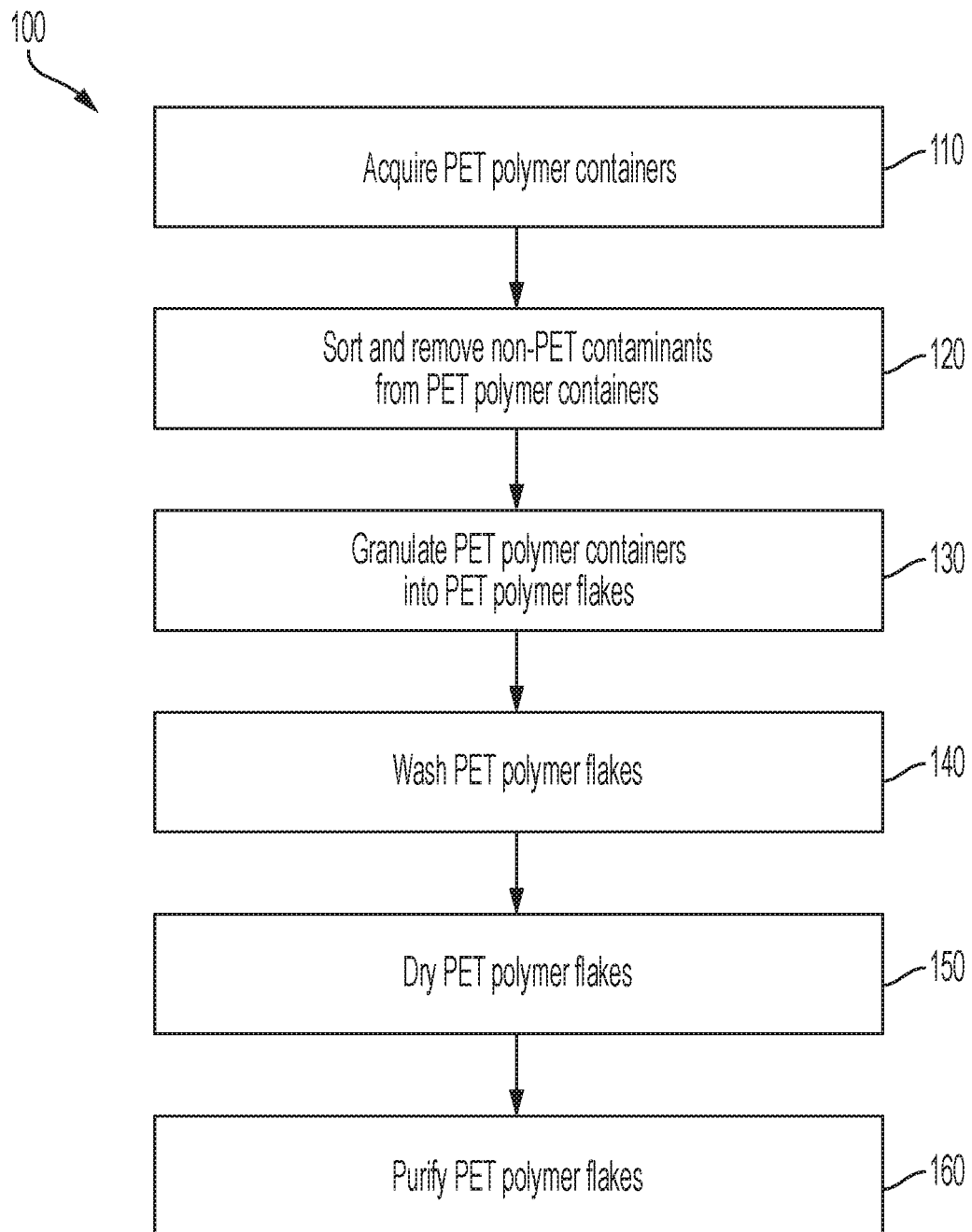
FIG. 1 depicts a process flow for a method of manufacturing polymer flakes according to an embodiment.

FIG. 1 illustrates a block diagram representing an exemplary Method 100 for generating polymer flakes according to various embodiments. In various embodiments, flakes of PET polymer may be prepared from post-consumer PET bottles. At Step 110, a system may acquire PET polymer containers (e.g., bottles). The system may use, as a source material, bales of clear and/or mixed colored recycled post-consumer PET containers (e.g., bottles) that may have been obtained, for example, from various recycling facilities. Such containers may also, or instead, be acquired from one or more facilities accepting such containers as returned 'deposit' bottles (e.g., PET bottles whose price includes a deposit that is returned to a customer when the customer returns the bottle after consuming the bottle's contents).

Such returned or recycled post-consumer containers may contain some amount of non-PET contaminants. Examples of such contaminants may include non-PET polymeric contaminants (e.g., polyvinyl chloride (PVC), polylactide (PLA), polypropylene (PP), polyethylene (PE), polystyrene (PS), polyamide (PA), etc.), metal (e.g., ferrous metal, non-ferrous metal), paper, cardboard, sand, glass and any other unwanted materials that may find their way into a collection of recycled post-consumer containers.

The disclosed systems may be configured to utilize recycled PET (e.g., as acquired at Step 110) of varying quality in the processes described herein. For example, in various embodiments, the system may configured to produce BCF from PET derived from PET bottles sourced from curbside recycling sources (e.g., PET bottles that were collected as part of a general bulk recycling program or other recycling source) as well as deposit PET bottles (e.g., bottles returned as part of a deposit program). In various embodiments, curbside recycled bottles may require more thorough processing in order to produce bulked continuous filament, as curbside recycled PET bottles may be mixed in with and otherwise include contaminants such as, for example: other recyclable goods (e.g., paper, other plastics, etc.), garbage, and other non-PET bottle items due to imperfect sorting of recycled goods or for any other reason. Deposit PET bottles may include PET bottles with fewer unwanted contaminants due in part because deposit PET bottles may be collected separately from other recyclable or disposable goods.

In various embodiments, curbside recycled PET bottles acquired during particular times of year may include more impurities and other contaminants than at other times of the year. For example, curbside recycled PET bottles collected during summer months may comprise a higher percentage of clear PET bottles (e.g., water bottles) at least in part due to additional water consumption during summer months.

At Step 120, the system may remove non-PET contaminants from the desired PET components (e.g. or recycled post-consumer containers). In particular embodiments, the system may remove smaller components and debris (e.g., components and debris greater than 2 inches in size) from whole bottles via a rotating trammel. In particular embodiments, the system may sort the containers at Step 120 by performing a binary segregation of clear containers from colored containers using automated color sorting equipment equipped with a camera detection system (e.g., a Multisort ES machine from National Recovery Technologies of Nashville, Tenn.). In various embodiments, the system may use manual sorters at various points on a production line to remove contaminants, for example, those contaminants not removed using a rotating trammel and/or one or more other methods. The system may also use manual sorters to separate colored and clear containers that have not been separated by automated sorting equipment.

At Step 130, the system may granulate the PET polymer containers (e.g., using a 50B Granulator machine from Cumberland Engineering Corporation of New Berlin, Wis.) to render, grind, shred, and/or otherwise size reduce the PET polymer containers into particles of a smaller size. In an embodiment, the system may grind or shred the PET polymer containers into flakes of, for example, a size of less than one half of an inch. These flakes, before undergoing a washing process, may be referred to as "dirty flake."

At Step 140, the system may wash and sort the dirty flake. In various embodiments, the system may remove contaminants such as bottle labels and other undesired components that were not removed in the PET polymer container cleaning and sorting steps from the dirty flake via an air separation system. Next, the system may wash the dirty flake to further remove any contaminants. The system may further process the washed flakes at Step 140 by identifying and removing any remaining impurities and/or impure flakes from the washed flakes. The system may use one or more metal removal magnets and/or one or more eddy current systems during the execution of Step 140 to remove any metal contaminants. In addition, or instead, at Step 140 the system may use near infra-red optical sorting equipment (e.g., an NRT Multi Sort IR machine from Bulk Handling Systems Company of Eugene, Oreg., or a Spyder IR machine from National Recovery Technologies of Nashville, Tenn.) to remove loose polymeric contaminants that may be mixed in with the PET polymer flakes (e.g., PVC, PLA, PP, PE, PS, PA, etc.). Additionally, or instead, the system may use automated X-ray sorting equipment such as a VINYLCYCLE machine from National Recovery Technologies of Nashville, Tenn. to remove remaining PVC contaminants.

To describe the washing process of Step 140 in more detail, the system may mix the dirty flake into a series of wash tanks. As part of the wash process, the system may use aqueous density separation to separate any bottle caps (e.g., olefin bottle caps, which may, for example, be present in the dirty flake as remnants from recycled PET polymer bottles) from the higher specific gravity PET polymer flakes. The system may wash the flakes in a heated caustic bath. In various embodiments, the system may heat the heated caustic bath to about 190 degrees Fahrenheit. In various embodiments, the system may maintain the caustic bath at a concentration of between about 0.6% and about 1.2% sodium hydroxide. In various embodiments, the system may use soap surfactants and/or defoaming agents that may be added to the caustic bath, for example, to further increase the separation and cleaning of the flakes. Further, at Step 140, the system may use a double rinse process to wash the caustic from the PET polymer flakes.

In various embodiments, the system may be adapted to ensure that the PET polymer being processed into filament is substantially free of water (e.g., entirely free of water). At Step 150, the washed PET polymer flakes may be dried as an initial step in reducing the water content of the flakes. In various embodiments, the system may centrifugally dewater the flakes and then dry the flakes with hot air to at least substantially remove any surface moisture. To further dry the flakes, the system may place the flakes into a pre-conditioner for between about 20 and about 40 minutes (e.g., about 30 minutes) during which the pre-conditioner blows the surface water off of the flakes. In particular embodiments, interstitial water may remain within the flakes. In various embodiments, the system may feed these "wet" flakes (e.g., flakes comprising interstitial water) into an extruder (e.g., as described herein), which may include a vacuum setup designed to remove—among other things—the interstitial water that remains present in the flakes following the relatively quick drying process described as part of Method 100.

At Step 160, the system may remove further contaminants from this resultant, dried "clean flake" using, for example, an electrostatic separation system (e.g., an electrostatic separator from Carpco, Inc. of Jacksonville, Fla.) and/or a flake metal detection system (e.g., an MSS Metal Sorting System) to further remove any metal contaminants that remain in the flake. In various embodiments, the system may also, or instead, use an air separation process to remove any remaining label fragments from the clean flake. The system may also color sort the PET polymer flake at Step 160 to remove further contaminants. In various embodiments, the system may process the flake using a flake color sorting step (e.g., using an OPTIMIX machine from TSM Control Systems of Dundalk, Ireland) to remove any color contaminants that may be remaining in the flake. In various embodiments, the system may use an electro-optical flake sorter based at least in part on Raman technology (e.g., a Powersort 200 from Unisensor Sensorsysteme GmbH of Karlsruhe, Germany) that performs a polymer separation to remove any non-PET polymers remaining in the flake. At this step, the system may also further remove any remaining metal contaminants and color contaminants.

For further contaminant removal, in various embodiments, at Step 160, the system may feed washed flakes down a conveyor and scan such flakes with a high-speed laser system. In various embodiments, the system may utilize one or more particular lasers that may be configured to detect the presence of particular contaminants (e.g., PVC or Aluminum). Flakes that are identified as not consisting essentially of PET polymer may be blown from the main stream of flakes with air jets.

In various embodiments, a system using the steps of Method 100 may deliver substantially clean (e.g., clean) PET polymer flake comprising less than about 50 parts per million PVC (e.g., 25 ppm PVC) and less than about 15 parts per million metals for use in the extrusion process embodiments described herein. In various embodiments, the resulting level of non-PET flakes is less than 25 ppm. Note that the steps of Method 100 may be performed in any order and in combination with any other steps or functions. Moreover, any aspect of any step of Method 100 may be performed separately and independently from any other aspect of Method 100. All such embodiments are contemplated as within the scope of the instant disclosure.

Flake Melting and Purification Process

In particular embodiments, a system according to various embodiments may process polymer flakes as described above and then use such flakes to generate molten recycled PET polymer. The system may perform one or more purification processes to prepare such a polymer to be used to create BCF that may be used in the manufacture of carpet.

Figure 2:
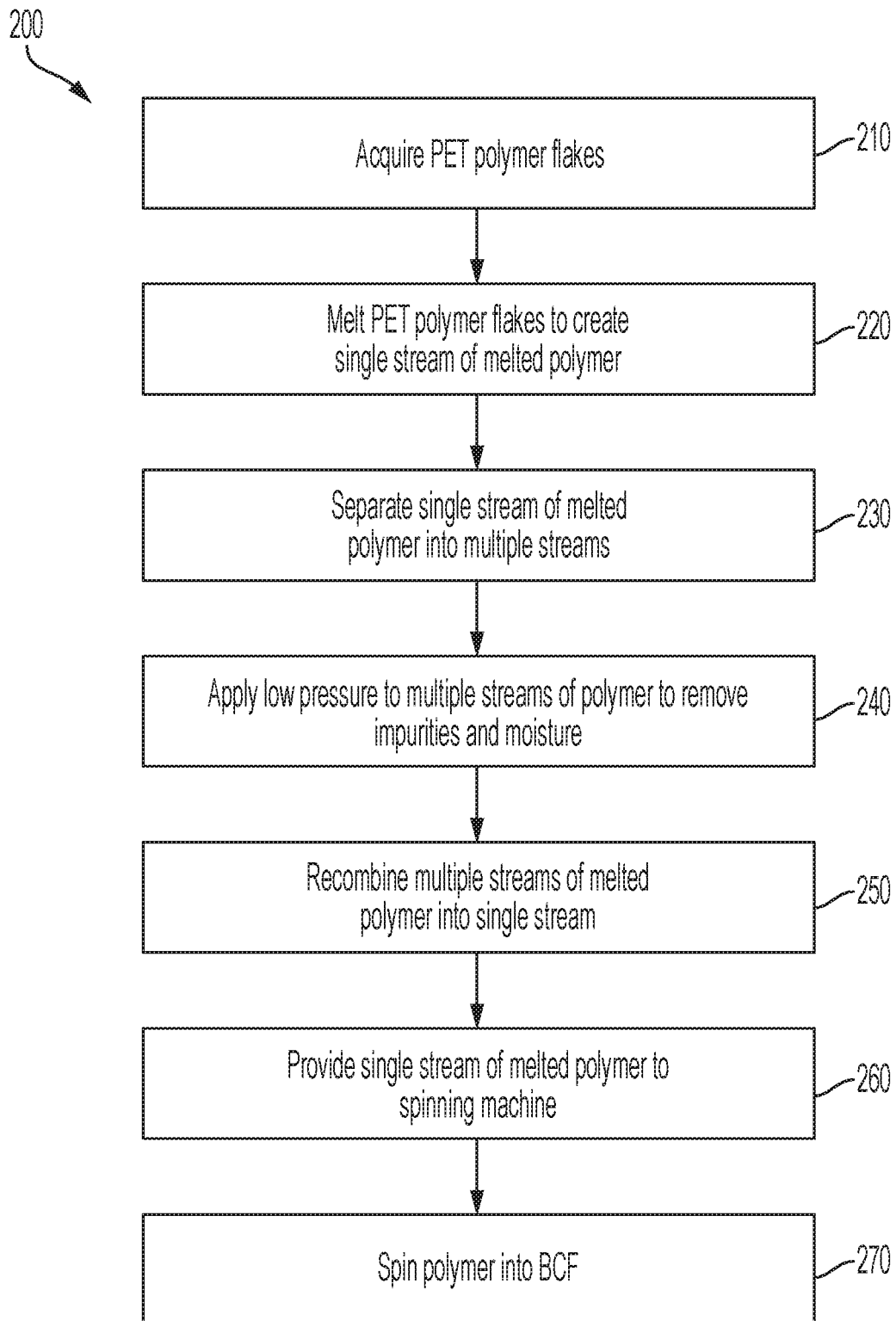
FIG. 2 depicts a process flow for a method of manufacturing bulked continuous filament from polymer flakes according to an embodiment.

FIG. 2 illustrates a block diagram representing an exemplary Method 200 for processing polymer flakes into BCF according to various embodiments. At Step 210, the system may acquire PET polymer flakes, such as recycled PET polymer flakes. In various embodiments, recycled PET polymer flakes, such as those that may be generated by Method 100 of FIG. 1, may be "wet." For example, while surface water may have been substantially removed (e.g., fully removed) from such flakes, interstitial water may remain in the flakes.

At Step 220, the system may apply heat to the flakes to melt them into a liquid form that may be used as a single stream of melted polymer. This may be performed in a Melt Processing Unit 340 of the system (e.g., in an extruder that is part of the Melt Processing Unit 340). In various embodiments, the system may melt the flakes in a first section of a Melt Processing Unit 340 having multiple sections, forming a single stream of melted polymer that may be provided to other sections of the Melt Processing Unit 340. In various embodiments, the system may also add color additives and mix the polymer in this section of the Melt Processing Unit 340 as described herein.

At Step 230, the system may separate the single stream of melted polymer into multiple streams of melted polymer to increase the surface area of the polymer melt for moisture removal purposes and for improving the intrinsic viscosity of the melt. For example, the system may feed the single stream of melted polymer into a multiple stream section of the Melt Processing Unit 340, where the system may separate the single stream of melted polymer into a plurality of different streams. For example, in various embodiments, the system may separate a single stream of melted polymer into between about 5 and about 15 streams (e.g., 8 streams); between about 100 and 500 streams; between about 1000 and 5000 streams (e.g., 1,000, 3,000 or 5,000 streams), or more streams in the multiple stream section of the Melt Processing Unit 340. According to one embodiment, the system separates the single stream of melted polymer into between approximately 2,000 and approximately 4,000 polymer streams. The system may separate the single stream of melted polymer into the multiple streams of melted polymer at an inlet of the multiple stream section of the Melt Processing Unit 340, or at any other suitable location. Such an inlet may utilize any type of mechanism or apparatus that may be configured to separate a single stream of melted polymer received from a first section of the Melt Processing Unit 340 into a desired number of multiple streams of melted polymer in the multiple stream section of the Melt Processing Unit 340. For example, an inlet in a first section of a Melt Processing Unit 340 may include a separation element that may comprise an extrusion die that defines a plurality of holes corresponding to a desired number of multiple streams of melted polymer. According to one embodiment, the plate may define holes corresponding to approximately 3,000 multiple streams of melted polymer. Any other type of separation element that is capable of separating a single stream of melted polymer into multiple streams of melted polymer is contemplated as within the scope of the disclosure.

The diameter of the holes used to separate the single stream of melted polymer into the multiple streams of melted polymer may depend on a desired flow rate and surface area of the multiple streams of melted polymer as they free fall through the multiple stream section of the Melt Processing Unit 340 toward an outlet of the multiple stream section of the Melt Processing Unit 340 and into a second, or receiving, section of the Melt Processing Unit 340. According to one embodiment, the diameter of the holes is less than 0.5 mm. According to other embodiments, the diameter of the holes is between approximately 0.05 mm and 0.5 mm. According to still other embodiments, the diameter of the holes is between approximately 0.1 mm and 0.3 mm. The shape of the holes used to separate the single stream of melted polymer into the multiple streams of melted polymer may be any suitable aperture shape (e.g., circular, oval, polygonal, star shaped, etc.).

After the single stream of melted polymer is split into multiple streams of melted polymer at the inlet of the multiple stream section of the Melt Processing Unit 340, the multiple streams of melted polymer may fall downward, assisted by gravity, toward an outlet of the multiple stream section of the Melt Processing Unit 340. The distance between the inlet of a multiple stream section and the outlet of a multiple stream section may be selected based on the desired characteristics of the single polymer stream created using the multiple streams of melted polymer passing through the multiple stream section of the Melt Processing Unit 340. This is because, in various embodiments, the distance between the multiple stream section's inlet and outlet may define how long each individual polymer stream is exposed to low pressure. As noted herein, the interior of the multiple stream section of the Melt Processing Unit 340 may be subjected to low pressures (for example, at Step 240 of Method 200), which may also affect the desired characteristics of the single polymer stream created using the multiple streams of melted polymer. For example, the distance between an inlet of a multiple stream section and an outlet of a multiple stream section may be between approximately 1 meter and approximately 4 meters, or between approximately 3.3 feet and approximately 13.1 feet. According to a particular embodiment, the distance between an inlet of a multiple stream section and an outlet of a multiple stream section may be approximately 2 meters or 6.6 feet.

By splitting the polymer melt into a large number of polymer streams at Step 230, the system may significantly increase the surface area of the melted polymer that may be exposed to an interior portion of a chamber within the Melt Processing Unit 340 (e.g., a chamber that defines at least a portion of the multiple stream section of the Melt Processing Unit 340.

At Step 240, lowered pressure (e.g., a vacuum or a near-vacuum) may be applied to the multiple streams of melted polymer in the multiple stream section of the Melt Processing Unit 340. The system may use a vacuum pump connected to the multiple stream section of the Melt Processing Unit 340 to reduce the pressure within that section. For example, the multiple stream section of the Melt Processing Unit 340 may be fitted with a vacuum pump that may be attached to a vacuum attachment portion of multiple stream section of the Melt Processing Unit 340 so that the vacuum pump is in communication with the interior of the Melt Processing Unit 340 via a suitable opening in the housing of the multiple stream section of the Melt Processing Unit 340. In various other embodiments, the multiple stream section of the Melt Processing Unit 340 may be fitted with multiple vacuum pumps, as described herein.

As the system maintains a reduced pressure within the multiple stream section of the Melt Processing Unit 340 using one or more vacuum pumps, the increased surface area of the polymer melt achieved using multiple streams of melted polymer causes water and other contaminates to evaporate from the surface of the polymer melt as the multiple streams of melted polymer fall through the multiple stream section of the Melt Processing Unit 340 from the inlet of the multiple stream section of the Melt Processing Unit 340 towards the outlet of the multiple stream section of the Melt Processing Unit 340. By applying lowered pressure to the multiple streams of melted polymer as they travel through the multiple stream section of the Melt Processing Unit 340, the system improves the intrinsic viscosity of the recycled PET polymer as the polymer chains in the polymer reconnect and extend the chain length.

The pressure applied to the multiple streams of melted polymer in the multiple stream section of the Melt Processing Unit 340 may be approximately 1 millibar or less. In an embodiment, the pressure applied to the multiple streams of melted polymer in the multiple stream section of the Melt Processing Unit 340 may be between approximately 0 millibars and approximately 1.5 millibars. In another embodiment, the pressure applied to the multiple streams of melted polymer in the multiple stream section of the Melt Processing Unit 340 may be between approximately 0.5 millibars and approximately 5 millibars. In another embodiment, the pressure applied to the multiple streams of melted polymer in the multiple stream section of the Melt Processing Unit 340 may be between approximately 0.5 millibars and 1.2 millibars. Any desired pressures described herein are equally applicable to the embodiments described here with respect to the of the multiple stream section of the Melt Processing Unit 340 used in Method 200.

At Step 250, at an outlet of the multiple stream section of the Melt Processing Unit 340 (or at any other suitable location within the Melt Processing Unit 340), the system may recombine the multiple streams of melted polymer into a single polymer stream. The system may feed this single stream into a receiving section of the Melt Processing Unit 340 that may, at Step 260, provide the polymer to one or more spinning machines. In an embodiment, at Step 250, the system may feed the multiple streams of melted polymer into an extruder section for transporting the melted polymer away from the multiple stream section of the Melt Processing Unit 340 and for forming the multiple streams of melted polymer into a single polymer stream. The system may run the single polymer stream through a filtration system that may include at least one filter. The system may also process the stream of melted polymer in any other desired manner, including as described herein.

At Step 270, after receiving the single polymer stream at Step 260, a spinning machine may use polymer from the single polymer stream to create BCF fiber for use in carpet manufacture. Alternatively, the system may route one or more of the multiple streams of melted polymer from the multiple stream section of the Melt Processing Unit 340 directly into a spinning machine. In another embodiment, the system may route one or more of the multiple streams of melted polymer from the multiple stream section of the Melt Processing Unit 340 into a spinning machine via a filtration system.

General PET Polymer Processing System

Figure 3A:
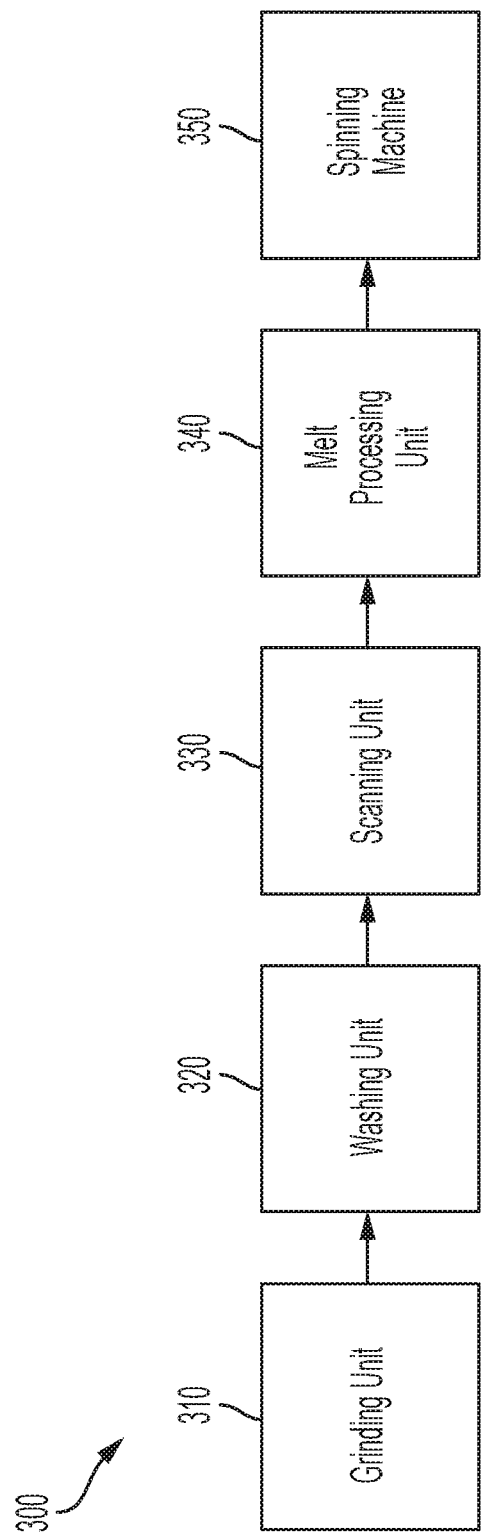
FIG. 3A is a block diagram of an exemplary system for manufacturing bulked continuous filament from polymer flakes according to an embodiment.

FIG. 3A illustrates a block diagram representing exemplary System 300 for processing PET polymer into BCF. System 300 may use PET from any suitable source, such as recycled PET polymer bottles. The source PET polymer may be processed, for example, as described above in regard to Method 100 of FIG. 1, in preparation for grinding into flakes. Following such processing, the System 300 may grind the source PET polymer into flakes at Grinding Unit 310. In various embodiments, the Grinding Unit 310 may perform a granulation of the source PET polymer (e.g., using a 50B Granulator machine from Cumberland Engineering Corporation of New Berlin, Wis.) to size-reduce (e.g., grind or shred) the source PET polymer down to a size of less than approximately one half of an inch. In various other embodiments, the Grinding Unit 310 may reduce the source PET polymer to relatively smaller prices that may be greater than approximately one half of an inch.

Washing Unit 320 may wash the flakes generated by Grinding Unit 310. Washing Unit 320 may mix the "dirty flakes" generated by Grinding Unit 310 into a series of wash tanks. Washing Unit 320 may employ an aqueous density separation as part of the its wash process to separate out contaminants such as bottle caps (e.g., olefin bottle caps) which may, for example, be present in the dirty flake as remnants from recycled PET bottles. Washing Unit 320 may take advantage of the higher specific gravity of polymer PET flakes to separate such flakes from other material in the dirty flake. Washing Unit 320 may wash the flakes in a heated caustic bath (e.g., heated to about 190 degrees Fahrenheit) that Washing Unit 320 may maintain at a concentration of between about 0.6% and about 1.2% sodium hydroxide. In various embodiments, soap surfactants and/or defoaming agents may be added to such a caustic bath, for example, to further increase the separation and cleaning of the flakes. Washing Unit 320 may utilize a double rinse system to wash the caustic from the flakes.

In various embodiments, Washing Unit 320 may centrifugally dewater and then dry the washed flake with hot air to at least substantially remove any surface moisture. Washing unit 320 may further process the resultant "clean flake" using an electrostatic separation system (e.g., an electrostatic separator from Carpco, Inc. of Jacksonville, Fla.) and a flake metal detection system (e.g., an MSS Metal Sorting System) to further remove any metal contaminants that remain in the flake. In particular embodiments, Washing Unit 320 may use air separation to remove any remaining label remnants from the clean flake. In various embodiments, Washing Unit 320 may perform a flake color sorting step (e.g., using an OPTIMIX machine from TSM Control Systems of Dundalk, Ireland) to remove any remaining color contaminants remaining in the flake. In various embodiments, Washing Unit 320 may use an electro-optical flake sorter based at least in part on Raman technology (e.g., a Powersort 200 from Unisensor Sensorsysteme GmbH of Karlsruhe, Germany) to perform polymer separation to remove any non-PET polymers remaining in the flake. This step may also further remove any remaining metal contaminants and color contaminants. The output of Washing Unit 320 may be substantially clean (e.g., clean) PET polymer flake having less than about 50 parts per million PVC (e.g., 25 ppm PVC) and less than about 15 parts per million metals.

After the washing step, System 300 may provide the flakes to Scanning Unit 330. In various embodiments, System 300 may feed flakes from Washing Unit 320 down a conveyor for scanning by Scanning Unit 330 using a high-speed laser system. Scanning Unit 330 may utilize particular lasers configured to detect the presence of particular contaminants (e.g., PVC, aluminum, other metals or polymers, etc.). Scanning Unit 330 may remove (e.g., by blowing with air jets) any flakes from a main stream of flakes that are identified by Scanning Unit 330 as not consisting essentially of PET polymer. In various embodiments, the resulting level of non-PET flakes in the remaining flakes is less than 25 ppm.

System 300 may provide the flakes processed by the Scanning Unit 330 to the Melt Processing Unit 340 to generate a molten PET polymer. System 300 and Melt Processing Unit 340 may perform one or more purification processes to prepare such a polymer to be used to create BCF that may be used in the manufacture of carpet.

Melt Processing Unit 340 may apply heat to PET polymer flakes to melt them into a liquid single stream of melted polymer. Melt Processing Unit 340 may perform this melting process in a chamber of a system for processing polymer as described herein, such as an extruder. In various embodiments, Melt Processing Unit 340 may melt the flakes in a first section of Melt Processing Unit 340 to form a single stream of melted polymer that may be provided to other sections of the Melt Processing Unit 340. In various embodiments, Melt Processing Unit 340 may also add color additives and mix the polymer in a section of the Melt Processing Unit 340.

Melt Processing Unit 340 may separate a single stream of melted polymer into multiple streams of melted polymer. This separation may increase the exposed surface area of polymer melt, thereby allowing for increased moisture removal. The separation of a single stream of melted polymer into multiple streams may also facilitate System 300's assessment and manipulation of the intrinsic viscosity and/or the moisture level of the melt. For example, System 300 may feed a single stream of melted polymer into a multiple stream section of Melt Processing Unit 340, where the single stream of melted polymer may be separated into a number of different streams. In various embodiments, System 300 may separate a single stream of melted polymer into 8, 100, 500, 1,000, 3,000, 5,000 or more streams in a multiple stream section of Melt Processing Unit 340. According to one embodiment, the Melt Processing Unit 340 of System 300 may separate a single stream of melted polymer into between approximately 2,000 and approximately 4,000 polymer streams.

The Melt Processing Unit 340 may separate a single stream of melted polymer into multiple streams of melted polymer at an inlet of a multiple stream section of a Melt Processing Unit 340, or any other location within the Melt Processing Unit 340. Such an inlet may utilize any type of mechanism or apparatus that may be configured to separate a single stream of melted polymer received from a first section of the Melt Processing Unit 340 into a desired number of multiple streams of melted polymer in the multiple stream section of the Melt Processing Unit 340. For example, an inlet in a first section of a Melt Processing Unit 340 may include an extrusion die defining a number of holes corresponding to a desired number of multiple streams of melted polymer. According to one embodiment, the die may define holes corresponding to approximately 3,000 multiple streams of melted polymer. In another embodiment, the die may define holes corresponding to between about 2,000 and about 4,000 multiple streams of melted polymer.

The diameter of the holes used by the Melt Processing Unit 340 to separate a single stream of melted polymer into multiple streams of melted polymer may depend on a desired flow rate and surface area of the multiple streams of melted polymer, for example, as they free fall through the multiple stream section of the chamber to a receiving section of the Melt Processing Unit 340. According to one embodiment, the diameter of the holes is less than about 0.5 mm. According to another embodiment, the diameter of the holes is between approximately 0.05 mm and approximately 0.5 mm. According to yet another embodiment, the diameter of the holes is between approximately 0.1 mm and approximately 0.3 mm. The shape of the holes used by the Melt Processing Unit 340 to separate a single stream of melted polymer into the multiple streams of melted polymer may be any desired aperture shape (e.g., circular, oval, polygonal, star shaped, etc.). In various embodiments, all holes used by the Melt Processing Unit 340 to separate a single stream of melted polymer into the multiple streams of melted polymer are the same shape, while in other embodiments, a portion of the holes used by the Melt Processing Unit 340 to separate a single stream of melted polymer into the multiple streams of melted polymer may have a shape that differs from the shape of other holes.

After System 300 separates a single stream of melted polymer is into multiple streams of melted polymer at an inlet of a multiple stream section of the Melt Processing Unit 340, System 300 may allow the multiple streams of melted polymer to fall downward, assisted by gravity, toward an outlet of the multiple stream section of the Melt Processing Unit 340. As discussed above, in various embodiments, the distance between an inlet of a multiple stream section of the Melt Processing Unit 340 chamber and an outlet of such a multiple stream section may depend on desired characteristics of the single polymer stream resulting from processing by the Melt Processing Unit 340. As noted herein, the multiple stream section may be subjected to low pressures which may affect the desired characteristics of the single polymer stream created using the multiple streams of melted polymer. For example, the distance between an inlet of a multiple stream section of a Melt Processing Unit 340 and an outlet of such a multiple stream section may be between approximately 1 meter and approximately 4 meters, or between approximately 3.3 feet and approximately 13.1 feet. According to another embodiment, the distance between an inlet of a multiple stream section of a Melt Processing Unit 340 and an outlet of such a multiple stream section may be approximately 2 meters or 6.6 feet.

By splitting a polymer melt into a large number of polymer streams, System 300 may significantly increase the surface area of the melted polymer that may be exposed to a low pressure within an interior of the chamber of the multiple stream section of the Melt Processing Unit 340. The Melt Processing Unit 340 may use a vacuum pump connected to the multiple stream section of a Melt Processing Unit 340 chamber to reduce the pressure within that section. For example, the multiple stream section of the Melt Processing Unit 340 chamber may be fitted with a vacuum pump that may be attached to a vacuum attachment portion of the multiple stream section of such a chamber so that the vacuum pump is in communication with the interior of the chamber via a suitable opening in the housing of the multiple stream section of the chamber. In various embodiments, the multiple stream section of the chamber may be fitted with multiple vacuum pumps, as described herein.

As System 300 maintains a reduced pressure in the multiple stream section of a Melt Processing Unit 340 chamber using one or more vacuum pumps, the increased surface area of the polymer melt achieved using multiple streams of melted polymer facilitates the evaporation of water and other contaminates from the surface of the polymer melt as the multiple streams of melted polymer fall through the multiple stream section of the Melt Processing Unit 340 chamber from the inlet of that section toward the outlet of that section. By applying lowered pressure to the multiple streams of melted polymer as it travels through the multiple stream section of such a chamber, the system improves the intrinsic viscosity of the melted polymer as the polymer chains in the polymer reconnect and extend the chain length.

The pressure applied to multiple streams of melted polymer in a multiple stream section of the Melt Processing Unit 340 chamber may be between approximately 0 millibars and approximately 1 millibar. In an embodiment, the pressure applied to multiple streams of melted polymer in a multiple stream section of the Melt Processing Unit 340 chamber may be between approximately 0 millibars and approximately 1.5 millibars. In another embodiment, the pressure applied to multiple streams of melted polymer in a multiple stream section of the Melt Processing Unit 340 chamber may be between approximately 0.5 millibars and approximately 5 millibars. In another embodiment, the pressure applied to multiple streams of melted polymer in a multiple stream section of a Melt Processing Unit 340 chamber may be between approximately 0.5 millibars and approximately 1.2 millibars. Any desired pressures described herein are equally applicable to the embodiments described here with respect to the multiple stream section of a Melt Processing Unit 340 chamber that may be used in a system such as System 300.

System 300, at an outlet of a multiple stream section of a Melt Processing Unit 340 chamber (or other suitable location), may recombine multiple streams of melted polymer into a single polymer stream. System 300 may feed this single stream into a receiving section of a Melt Processing Unit 340 chamber and may then provide the polymer to one or more Spinning Machines 350 for spinning into BCF fibers. In an embodiment, System 300 may feed multiple streams of melted polymer into an extruder section for transporting the melted polymer away from the multiple stream section of the Melt Processing Unit 340 chamber and for forming the multiple streams of melted polymer into a single polymer stream. In this embodiment, the extruder itself may be understood to be the "outlet" of the Melt Processing Unit 340 since the extruder receives the fallen polymer material and transports it out of the multi-stream section of the Melt Processing Unit. In various embodiments, the extruder is positioned vertically immediately below a device that is used to divide the polymer melt into multiple streams so that the multiple streams can fall directly from the device into the extruder under the weight of gravity.

System 300 may process a single polymer stream through a filtration system that may include at least one filter. System 300 may also, or instead, process a stream of melted polymer in any desired manner, including as described herein. After receiving a single polymer stream, the Spinning Machine 350 may use polymer from the single polymer stream to create BCF fibers for use in carpet manufacture. Alternatively, or in addition, System 300 may route one or more of the multiple streams of melted polymer directly from the multiple stream section of the Melt Processing Unit 340 chamber into the one or more Spinning Machines 350. In another embodiment, System 300 may route one or more of the multiple streams of melted polymer from the multiple stream section of the Melt Processing Unit 340 chamber into the Spinning Machine 350 via a filtration system.

In various embodiments, the one or more Spinning Machines 350 may be configured to turn molten polymer into bulked continuous filament. In various embodiments, the output of the Melt Processing Unit 340 is connected substantially directly (e.g., directly) to the input of the one or more Spinning Machines 350 so that molten polymer from the Melt Processing Unit 340 is fed directly into the one or more Spinning Machines 350. This process may be advantageous because molten polymer may, in certain embodiments, not need to be cooled and formed into pellets after extrusion. In particular embodiments, not cooling and forming the recycled molten polymer into pellets serves to avoid potential chain scission in the polymer that might lower the polymer's intrinsic viscosity. In alternative embodiments, polymer from the output of the Melt Processing Unit 340 is cooled and formed into pellets and the pellets are later formed into BCF by the one or more Spinning Machines 350.

Each of the one or more Spinning Machines 350 may extrude molten polymer through small holes in a spinneret in order to produce carpet yarn filament from the polymer. In particular embodiments, the molten recycled PET polymer cools after leaving the spinneret. The carpet yarn may then be taken up by rollers and ultimately turned into filament that is used to produce carpet. In various embodiments, the carpet yarn produced by the Spinning Machine 350 may have a tenacity of between about 3 gram-force per unit denier (gf/den) and about 9 gf/den. In particular embodiments, the resulting carpet yarn has a tenacity of at least about 3 gf/den.

The one or more Spinning Machines 350, and other spinning machines contemplated for use with the disclosed embodiments, may include the Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread if there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlika Neumag of Neumuenster, Germany or any other company.

In various embodiments, the improved strength of the recycled PET polymer generated using the process above allows it to be run at higher speeds through the Spinning Machine 350 than would be possible using pure virgin PET polymer. This may allow for higher processing speeds than are possible when using virgin PET polymer.

Figure 3B:
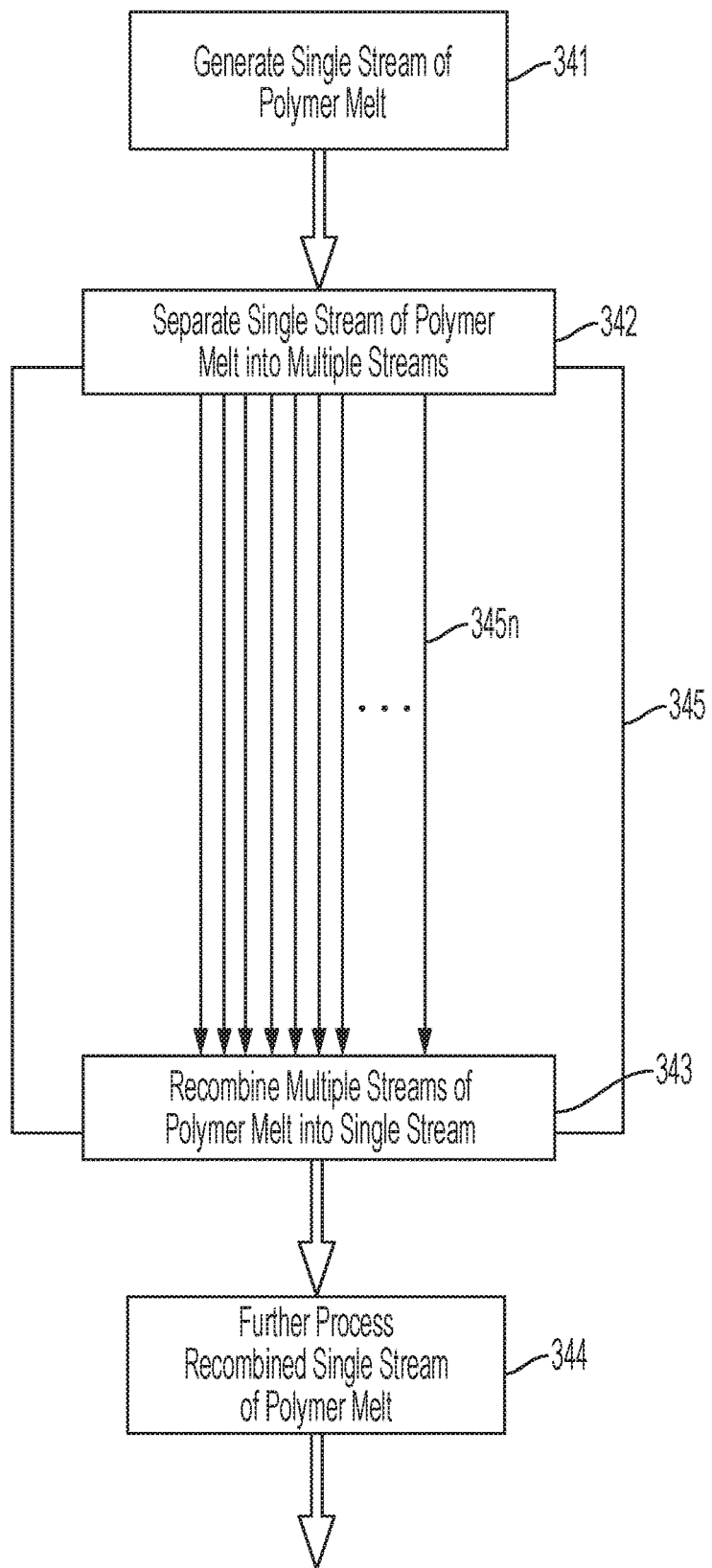
FIG. 3B is a block diagram depicting the operation of an exemplary melt processing system that may be used in a process for manufacturing bulked continuous filament from polymer flakes according to an embodiment.

FIG. 3B illustrates the operation of an exemplary Melt Processing Unit 340. Melt Processing Unit 340 may melt polymer flakes, for example, received from Scanning Unit 330 or from another source of polymer flake. The Melt Processing Unit 340 may use the resultant molten polymer to generate a single stream of polymer melt 341. To generate such a single stream of polymer melt, the Melt Processing Unit 340 may apply heat to PET polymer flakes to melt them into a liquid single stream of melted polymer. The Melt Processing Unit 340 may perform this melting process in a chamber dedicated to melting polymer flakes. In some embodiments, this chamber may be an extruder or a section of an extruder. Alternatively, the Melt Processing Unit 340 may melt the flakes in a first section of a chamber having multiple sections. The Melt Processing Unit 340 may provide the single stream of melted polymer to another chamber (or another chamber section) of the Melt Processing Unit 340, such as multiple stream chamber 345, for splitting into multiple streams. In various embodiments, the Melt Processing Unit 340 may also add color additives and mix the polymer in chamber or section 341.

As discussed above, in various embodiments, the single stream of melted polymer may be split into multiple streams of melted polymer by separation element 342. By separating the single stream of polymer into multiple streams, the surface area of polymer melt may be increased (e.g., greatly increased) and therefore the removal of moisture and impurities from the polymer melt may be enhanced. Separating the single stream of melted polymer into multiple streams may also assist in measuring and manipulating the intrinsic viscosity and/or the moisture level of the melt. In various embodiments, at separation element 342, the single stream of polymer melt may be separated into any suitable number of streams (e.g., 4-10, 50-100, 500-1000, 1,000-5,000 or more streams) in the multiple stream chamber 345 of the Melt Processing Unit 340. According to one embodiment, the Melt Processing Unit 340, using the separation element 342, may separate a single stream of melted polymer into between approximately 2,000 and approximately 4,000 polymer streams.

The separation element 342 may be an extrusion die defining a plurality of holes corresponding to a desired number of multiple streams of melted polymer. In various embodiments, the separation element 342 may define approximately 3,000 holes configured to generate a corresponding number of multiple streams of melted polymer. In another embodiment, the separation element 342 may define between approximately 2,000 and approximately 4,000 holes configured to generate a corresponding number of multiple streams of melted polymer. The diameter and shape of the holes configured at the separation element 342 may depend on a desired flow rate and surface area of the multiple streams of melted polymer, for example, as they free fall through the multiple stream chamber 345 to a recombination element 343.

The multiple streams of melted polymer may be allowed to fall downward, assisted by gravity, to recombination element 343 of the multiple stream chamber 345 of the Melt Processing Unit 340. As noted above, the distance through which such multiple streams are to fall or otherwise travel may depend on desired characteristics of the resultant single polymer stream. While travelling through the multiple stream chamber 345, the multiple streams of polymer melt may be subjected to low pressures which may affect the desired characteristics of the single polymer stream created using the multiple streams of melted polymer. In various embodiments, one or more vacuum pumps may be connected to the multiple stream chamber 345 to reduce and maintain a lowered pressure within that chamber. As the pressure in the multiple stream chamber 345 is reduced, the evaporation of water and other contaminates from the surface of the multiple streams of polymer melt may be facilitated as the multiple streams of melted polymer fall through the multiple stream chamber 345. Also, as a result of the application of lowered pressure to the multiple streams of melted polymer, the intrinsic viscosity of the melted polymer may be improved as the polymer chains in the polymer reconnect and extend the chain length.

The pressure applied to multiple streams of melted polymer in the multiple stream chamber 345 may, in various embodiments, be between about 0 millibars and 1 millibar. In an embodiment, the pressure within the multiple stream chamber 345 may be between about 0 millibar and about 1.5 millibars. In another embodiment, the pressure within the multiple stream chamber 345 may be between about 0.5 millibars and about 5 millibars. In another embodiment, the pressure within the multiple stream chamber 345 may be between approximately 0.5 millibars and approximately 1.2 millibars.

The multiple streams of melted polymer may be recombined at the recombination element 343 into a single polymer stream. The recombination element 344 may be a chamber in which the multiple streams are permitted to recombine into a single stream of melted polymer. In various embodiments, the recombination element 344 may comprise an extruder and/or a section and/or a chamber of an extruder. This single stream may undergo further processing at 344, which may include filtering and/or further purification, before being provided to one or more spinning machines for spinning into BCF fibers or to another destination for other processing.

Example PET Polymer Melt Processing Unit

Figure 4:
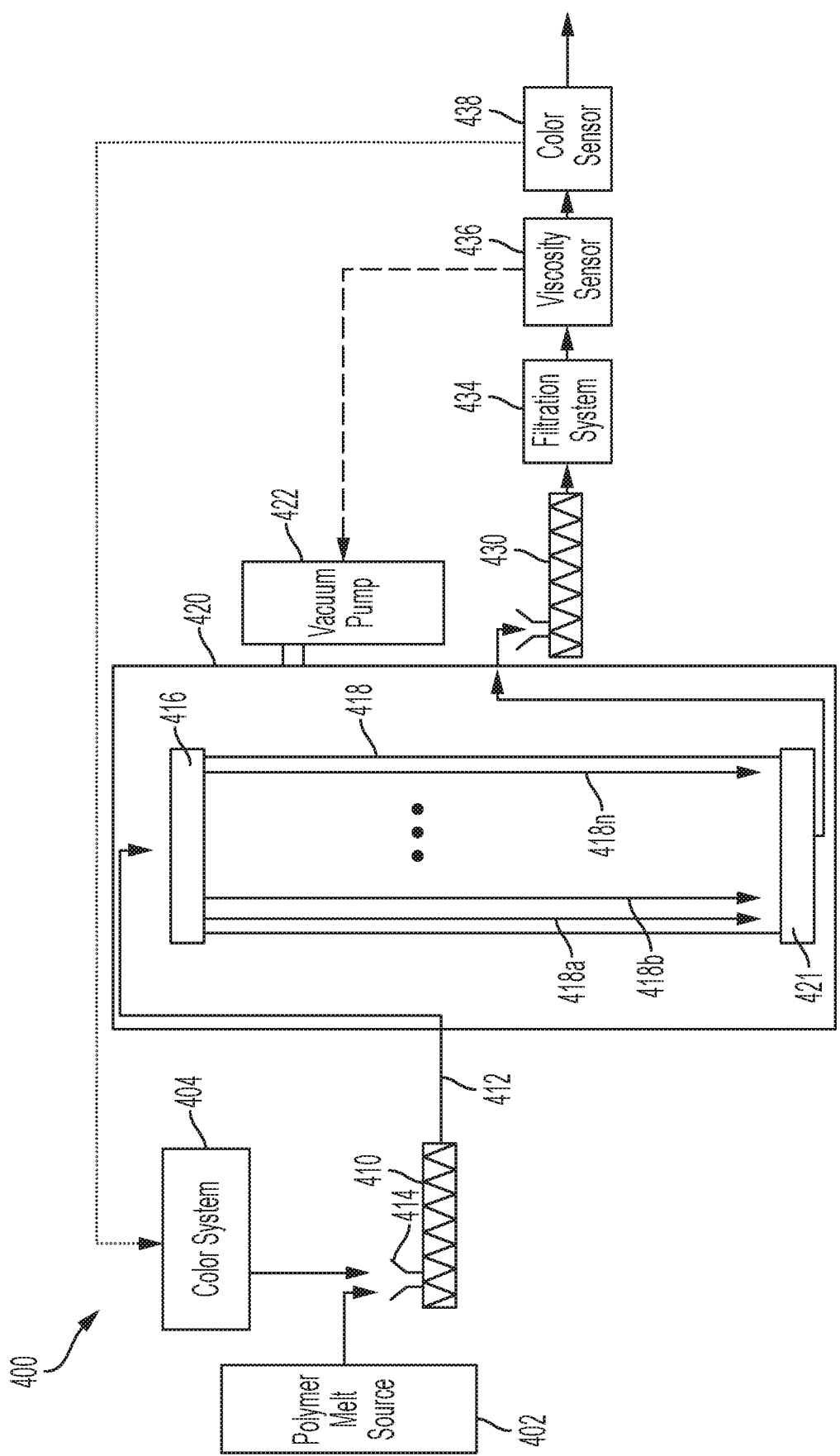
FIG. 4 depicts an exemplary polymer melt processing unit according to an embodiment.

FIG. 4 illustrates an exemplary PET Polymer Melt Processing Unit 400. According to various embodiments, a polymer melt or source of polymer for melting may be generated by a Polymer Melt Source 402, for example, by a polymer melt generation system or device, which may include an extruder (e.g., a single-screw extruder). Polymer Melt Source 402 may operate in conjunction with a Color System 404 that adds color concentrate and/or otherwise manipulates the color of a resulting polymer melt. A source of polymer may be provided to first section 410 of Melt Processing Unit 400 via inlet 414. First section 410 of Melt Processing Unit 400 may be configured with an extruder configured to melt polymer flakes, generate a single stream of polymer melt 412, or otherwise provide the single stream of polymer melt 412 to the multiple stream section 420 of Melt Processing Unit 400.

In various embodiments, wet flakes may first be fed through an extruder or other system by Polymer Melt Source 402 that may generate sufficient heat (e.g., via shearing) to at least substantially melt (e.g., melt) the wet flakes. First section 410 may perform this function, or Polymer Melt Source 402 may perform this function. In various embodiments, first section 410 and Polymer Melt Source 402 may work in conjunction to generate and/or color polymer melt to create the single stream of polymer melt 412 provided to the multiple stream section 420 of Melt Processing Unit 400. The Melt Processing Unit 400 may be configured to operate in conjunction with Color System 404 to add a solution dye color concentrate to the flakes (e.g., wet flakes) before feeding the flakes into the first section 410 or other system for melting. In particular embodiments, the solution dye color concentrate may include any suitable color concentrate, which may, for example, result in a particular color of polymer fiber following extrusion. As described herein, the Color System 404 may be configured to adjust an amount of solution dye color concentrate added to the flakes prior to feeding the flakes through the first section 410 or other system for melting. For example, according to various embodiments, the Color System 404 is configured to add between about two percent and about three percent color concentrate by mass to the polymer flake. In other embodiments, the Color System 404 is configured to add between about zero percent and about three percent color concentrate by mass. In still other embodiments, the Color System 404 is configured to add up to about six percent color concentrate by mass to the polymer flake. In some embodiments, the Color System 404 is configured to add between about one percent and about three percent color concentrate by mass to the polymer flake. In still other embodiments, the Color System 404 is configured to add any suitable ratio of color concentrate to polymer flake in order to achieve a particular color of molten polymer (and ultimately polymer fiber) following extrusion.

Although in some embodiments, the Color System 404 may add color concentrate to polymer flake prior to feeding the flake through the first section 410 or other system for melting polymer flake, it should be understood that in other embodiments, the Color System 404 may add color concentrate during any other suitable phase of the processes described herein. For example, according to various embodiments, the Color System 404 may be configured to add the color concentrate following extrusion or melting of the polymer flake by the first section 410 or other system for melting polymer flake but prior to feeding the resultant polymer melt through the multiple stream section 420 of Melt Processing Unit 400. In still other embodiments, the Color System 404 may add color concentrate after the flake has passed through the multiple stream section 420 of Melt Processing Unit 400 but prior to passing the polymer melt from Melt Processing Unit 400 onto a spinning machine, as discussed herein. In still other embodiments, the Color System 404 may add the color concentrate while the flakes and/or polymer melt are being extruded in an extruder or other system for melting, while the polymer melt is in multiple stream section 420 of Melt Processing Unit 400, while the polymer melt is in receiving section 440 of Melt Processing Unit 400, or at any other suitable phase of the process. In still other embodiments, the Color System 404 may add the color concentrate during one or more (e.g., a plurality) of the phases of any of the processes described herein (e.g., the disclosed systems may add some color concentrate to the polymer flake prior to passing the flake through the first section 410 and then add additional solution color concentrate following processing through the multiple stream section 420. Following the addition of the color concentrate and extrusion or otherwise melting of the polymer provided by Polymer Melt Source 402, the resultant single stream of polymer melt 412 (e.g., comprising the melted flakes and color concentrate), in various embodiments, may then be fed through to the multiple stream section 420 of Melt Processing Unit 400.

In the multiple stream section 420 of the Melt Processing Unit 400, the single stream of polymer melt 412 may be split into a plurality of polymer streams 418 (e.g., 418a, 418b, 418c, . . . 418n) to increase the surface area of the polymer melt for water removal and intrinsic viscosity purposes. As noted, the separation of a single stream of melted polymer into multiple streams may also facilitate assessment and manipulation of the intrinsic viscosity of the melt. In various embodiments, the Melt Processing Unit 400 may separate single stream of melted polymer 412 into between 6 and 5000 or more streams (e.g., 8, 100, 500, 1,000, 3,000, 5,000 or more streams) in multiple stream section 420. According to one embodiment, the Melt Processing Unit 400 may separate single stream of melted polymer 412 into between approximately 2,000 and approximately 4,000 polymer streams 418.

The Melt Processing Unit 400 may separate single stream of melted polymer 412 into multiple streams of melted polymer 418 at separation element 416 of multiple stream section 420. Such an element may utilize any type of mechanism or apparatus that may be configured to separate single stream of melted polymer 412 received from a first section 410 into a desired number of multiple streams of melted polymer 418 in the multiple stream section 420. For example, the separation element 416 may include a plate that may have a number of holes corresponding to a desired number of multiple streams of melted polymer. According to one embodiment, a plate configured at the separation element 416 may have holes corresponding to approximately 3,000 multiple streams of melted polymer. In some embodiments, such a plate may have holes corresponding to between approximately 2,000 and approximately 4,000 multiple streams of melted polymer.

The diameter of the holes used by a plate configured at the separation element 416 to separate the single stream of melted polymer 412 into the multiple streams of melted polymer 418 may depend on a desired flow rate and surface area of the multiple streams of melted polymer, for example, as they free fall through the multiple stream section 420 to an outlet 421 of the multiple stream section 420 and are provided to a second, or receiving, section 430 of the Melt Processing Unit 400. According to one embodiment, the diameter of the respective holes in plate 416 is less than 0.5 mm. According to another embodiment, the diameter of the holes in a plate configured at the separation element 416 is between approximately 0.05 mm and approximately 0.5 mm. According to yet another embodiment, the diameter of the holes in a plate configured at the separation element 416 is between approximately 0.1 mm and 0.3 mm. The shape of the holes in such a plate may be any desired aperture shape (e.g., circular, oval, polygonal, star shaped, etc.). In various embodiments, all holes in a plate configured at the separation element 416 are the same shape, while in other embodiments, a portion of such holes may have a shape that differs from the shape of other holes.

By splitting the polymer melt into a large number of polymer streams 418, the surface area of the polymer exposed to multiple stream section 420 of Melt Processing Unit 400 is significantly increased. As described herein, a Vacuum Pump 422 may be connected to the multiple stream section 420 of Melt Processing Unit 400 to reduce the pressure within the multiple stream section 420. In various embodiments, the Vacuum Pump 422 may be attached to a vacuum attachment portion of the multiple stream section 420 so that the Vacuum Pump 422 is in communication with the interior of the multiple stream section 420 via a suitable opening in the Melt Processing Unit 400's housing. In still other embodiments, the Melt Processing Unit 400 may be fitted with a series of vacuum pumps, as described herein. The reduced pressure generated by the Vacuum Pump 422 and the increased surface area of the polymer melt achieved by numerous polymer streams 418 may facilitate the evaporation of water and other contaminates from the surface of the polymer melt as the polymer streams 418 fall towards the outlet 421 and are provided to the receiving section 430 of Melt Processing Unit 400. In doing so, the intrinsic viscosity of the recycled PET polymer may be improved as the polymer chains in the polymer reconnect and extend the chain length. The desired pressures described herein with respect to other figures and embodiments are equally applicable to the embodiments described here with respect to the multiple stream section 420 of Melt Processing Unit 400.

Melt Processing Unit 400 may include the receiving section 430 where the polymer streams 418 may be recombined into a single polymer stream and flow into a system (e.g., an extruder) for transporting material away from the multiple stream section 420 of Melt Processing Unit 400. In various embodiments, the Melt Processing Unit 400 may run the resultant single stream of molten polymer through a Filtration System 434 that may include at least one filter. After processing by the Melt Processing Unit 400, the resultant single stream of polymer melt may be processed according to any other embodiments described herein or in any other manner. The single polymer stream may be routed from the Melt Processing Unit 400 directly into a spinning machine or to a spinning machine via Filtration System 434.

Melt Processing Unit 400 may utilize a Viscosity Sensor 436 to sense the melt viscosity of the molten polymer stream following its passage through the Filtration System 434. In various embodiments, the Viscosity Sensor 436 measures the melt viscosity of the stream, for example, by measuring the stream's pressure drop across a known area. In particular embodiments, in response to measuring an intrinsic viscosity of the stream that is below a predetermined level (e.g., below about 0.8 g/dL), the Melt Processing Unit 400 may discard the portion of the stream with low intrinsic viscosity and/or lower the pressure in the multiple stream section 420 of Melt Processing Unit 400 in order to achieve a higher intrinsic viscosity in the polymer melt. For example, the Viscosity Sensor 436 may be in communication with the Vacuum Pump 422 and may instruct the Vacuum Pump 422 to adjust the pressure applied to the multiple stream section 420 of Melt Processing Unit 400 based on the detected viscosity of the molten polymer stream. In particular embodiments, the Melt Processing Unit 400 may adjust the pressure in the multiple stream section 420 in a substantially automated manner (e.g., automatically) using the Viscosity Sensor 436 in a computer-controlled feedback control loop with the Vacuum Pump 422.

Melt Processing Unit 400 may utilize a Color Sensor 438 to determine a color of the resultant polymer melt. In various embodiments, the Color Sensor 438 may include one or more spectrographs configured to separate light shone through the polymer melt into a frequency spectrum to determine the color of the polymer melt. In other embodiments, the Color Sensor 438 may include one or more cameras or other suitable imaging devices configured to determine a color of the resultant polymer melt. In response to determining at the Color Sensor 438 that the color of the polymer melt is a color other than a desired color (e.g., the polymer melt is lighter than desired, darker than desired, a color other than the desired color, etc.) the Melt Processing Unit 400 may discard the portion of the stream with the incorrect color. Alternatively, or in addition, the Melt Processing Unit 400 may adjust an amount of color concentrate that is added to the flake and/or the polymer melt at the Color System 404 in order to adjust a color of the resultant polymer melt. For example, the Color Sensor 438 may be in communication with the Color System 404 and may instruct the Color System 404 to adjust the color concentrate(s) applied to the flakes and/or melt based on the detected color of the resultant polymer stream. In particular embodiments, the Melt Processing Unit 400 may adjust the amount and type of color concentrate used at Color System 404 in a substantially automated manner (e.g., automatically) using the Color Sensor 438 in a computer-controlled feedback control loop with the Color System 404.

Example Extruder for Melting and Purifying PET Polymer Flakes

Figure 5:
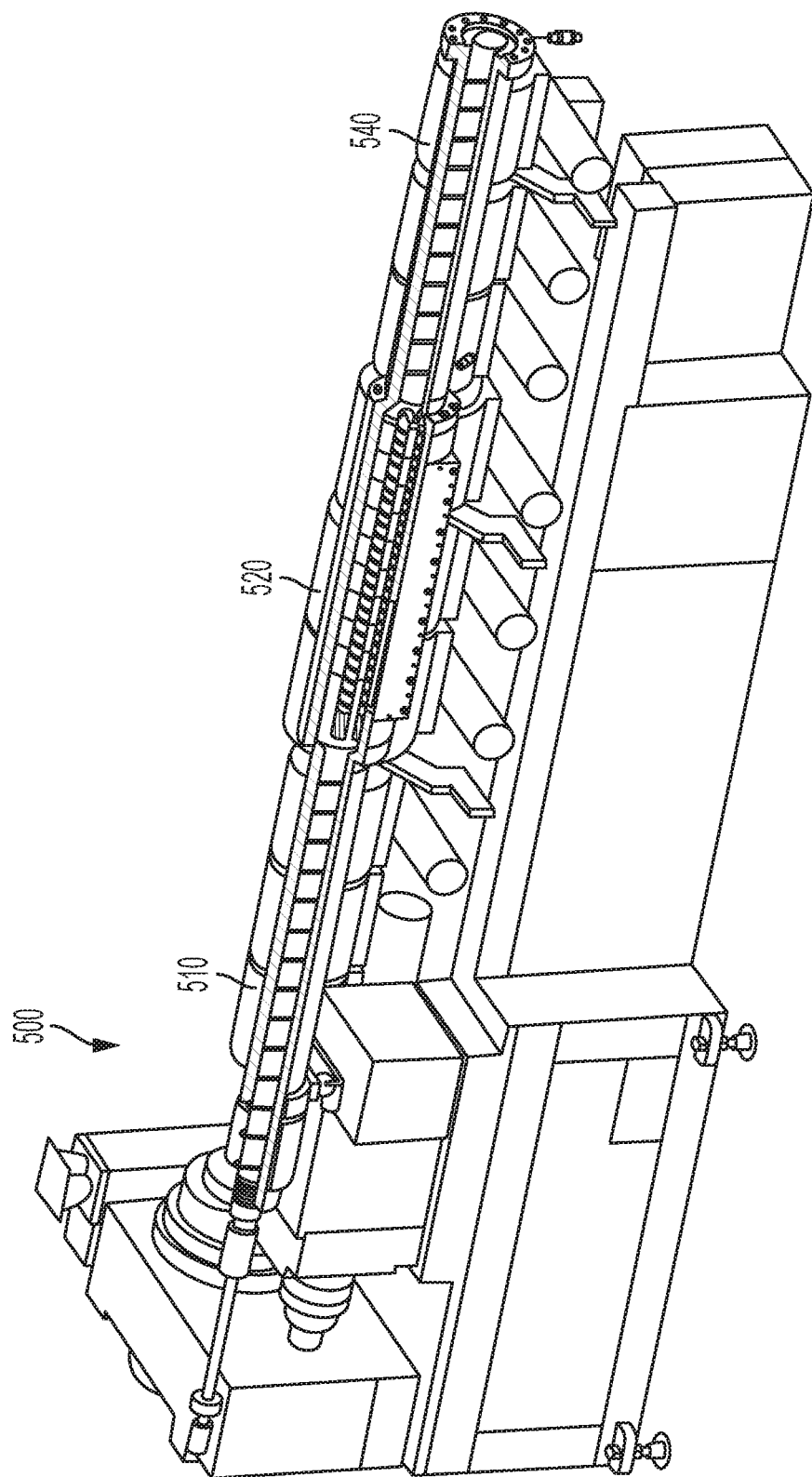
FIG. 5 depicts an exemplary extruder that may be used in a BCF manufacturing process according to an embodiment.

In particular embodiments, an extruder may be used to turn the wet flakes described herein into a molten recycled PET polymer and/or to perform a number of purification processes to prepare a polymer to be turned into BCF for use in manufacturing carpet. FIG. 5 illustrates an example extruder 500 that may be used in some embodiments. In particular embodiments, the Melt Processing Unit 340 may comprise this example extruder 500.

In various embodiments, polymer flakes may be generated from a source of polymer, such as recycled PET polymer containers. As noted above, these flakes may be "wet" (e.g., surface water may have been substantially removed (e.g., fully removed) from the flakes, but interstitial water may remain in the flakes). In particular embodiments, the system may feed these wet flakes into an extruder 500. Example extruders that may be used with a variety of embodiments include a twin screw extruder, a multiple screw extruder, a planetary extruder, a Multiple Rotating Screw ("MRS") (e.g., as described in U.S. Published Patent Application 2005/0047267, entitled "Extruder for Producing Molten Plastic Materials", which was published on Mar. 3, 2005, and which is hereby incorporated herein by reference), and any other suitable extrusion system. In a various embodiments, the disclosed systems and processes may utilize a plurality of extruders configured in any suitable combination (e.g., four twin screw extruders, three multiple screw extruders, etc.).

Exemplary extruder 500 may include a first single-screw extruder section 510 that may feed material into a multiple screw section 520 and a second single-screw extruder section 540 that may transport material away from the multiple screw section 520.

In various embodiments, wet flakes may be fed directly into the extruder 500 substantially immediately (e.g., immediately) following a washing step, such as the example washing steps described herein (e.g., without drying the flakes or allowing the flakes to dry). By feeding wet flakes directly into the extruder 500 substantially immediately (e.g., immediately) following a washing step, the disclosed embodiments may consume about 20% less energy than a system that substantially fully pre-dries the flakes before extrusion (e.g., a system that pre-dries the flakes by passing hot air over the wet flakes for a prolonged period of time). Furthermore, by feeding the wet flakes directly into the extruder 500 substantially immediately (e.g., immediately) following a washing step, the disclosed embodiments may avoid the requirement to allow for a particular period of time (e.g., up to eight hours) to fully dry the flakes (e.g., remove substantially all of the surface and interstitial water from the flakes).

The system may first feed wet flakes through the extruder 500's first single-screw extruder section 510, which may, for example, generate sufficient heat (e.g., via shearing) to at least substantially melt (e.g., melt) the wet flakes.

In various embodiments, the system may be further configured to add a color concentrate (e.g., a solution dye color concentrate) to the flakes (e.g., wet flakes) before feeding the flakes into the first single-screw extruder section 510. A solution dye color concentrate used in any embodiment described herein may include any suitable color concentrate, which may, for example, result in a particular color of polymer fiber following processing according to disclosed embodiments. In particular embodiments, the color concentrate may comprise pelletized color concentrate as well as a carrier resin which may, for example, bind the colorant to the polymer. In various embodiments, adding color concentrate to the flakes prior to melting and/or processing may result in polymer filament that is at least partially impregnated (e.g., impregnated) with a color pigment. Carpet produced from solution dyed filament created according to such embodiments may be highly resistant to color loss through fading from sunlight, ozone, harsh cleaning agents such as bleach, or other factors.

The system may be configured to adjust an amount of color concentrate to add to the flakes prior to feeding the flakes thought the first single-screw extruder section 510. In particular embodiments, the system may be configured to add between about two percent and about three percent color concentrate by mass to the polymer flake. In other embodiments, the system may be configured to add between about zero percent and about three percent color concentrate by mass to the polymer flake. In still other embodiments, the system may be configured to add up to about six percent color concentrate by mass to the polymer flake. In some embodiments, the system is configured to add between about one percent and three percent color concentrate by mass to the polymer flake. In still other embodiments, the system is configured to add any suitable ratio of color concentrate to polymer flake in order to achieve a particular color of molten polymer (and ultimately polymer fiber) following extrusion.

Note that in various embodiments, color concentrate may be added during any other suitable phase of any of the example processes described in this document. For example, color concentrate may be added following extrusion of the polymer flake by the first single-screw extruder section 510 but prior to feeding the resultant polymer melt through the extruder 500's multiple screw section 520. In other embodiments, the system may add color concentrate after the flake has passed through the extruder 500's multiple screw section 520 but prior to passing the polymer melt through the second single-screw extruder section 540. In still other embodiments, they system may add color concentrate while the flakes and/or polymer melt are being extruded in the extruder 500's first single-screw extruder section 510, multiple screw section 520, second single-screw extruder section 540, or at any other suitable phase of the process. In still other embodiments, the system may add color concentrate during one or more (e.g., a plurality) of the phases of any of the example processes described herein (e.g., the system may add some color concentrate to the polymer flake prior to passing the flake through the first single-screw extruder section 510 and may then add some additional solution color concentrate following extrusion through the multiple screw section 520).

Figure 6:
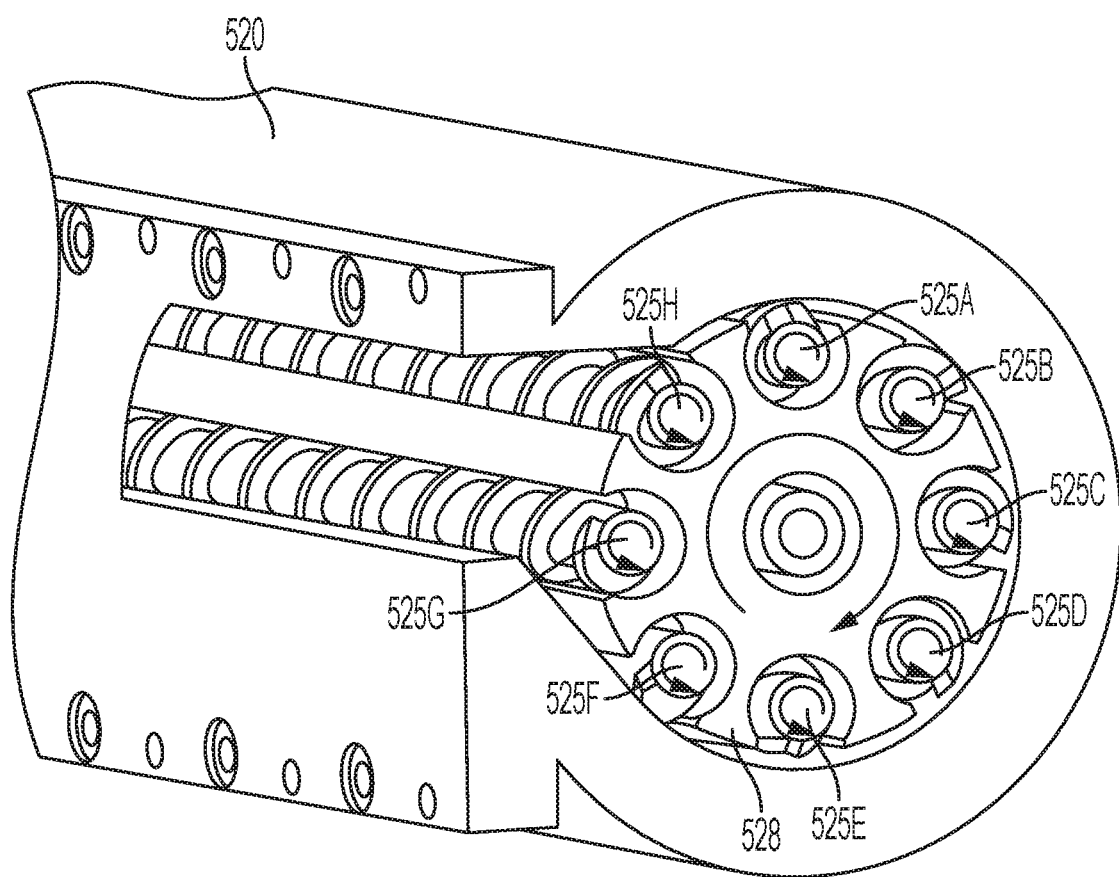
FIG. 6 depicts a cross-section of the exemplary extruder of FIG. 5.

Following the addition of the color concentrate and extrusion by first single-screw extruder section 510, the system may feed the resultant polymer melt (e.g., comprising the melted flakes and color concentrate) into the extruder's 500's multiple screw section 520, in which the extruder 500 may separate the melt flow into a plurality of different streams (e.g., 4, 6, 8, or more streams) through a plurality of open chambers. FIG. 6 illustrates a detailed cutaway view of the multiple screw section 520 according to a particular embodiment. In embodiments such as that shown in this figure, the multiple screw section 520 separates the melt flow into eight different streams, which are subsequently fed through eight satellite screws 525A-H. As may be understood from the figures, in particular embodiments, these satellite screws 525A-H may be substantially parallel (e.g., parallel) to one other and to a primary screw axis of the extruder 500.

In the multiple screw section 520, in various embodiments, the satellite screws 525A-H may, for example, rotate faster than (e.g., about four times faster than) in previous systems. As shown in FIG. 6, in particular embodiments the satellite screws 525A-H may be arranged within a single screw drum 528 that is mounted to rotate about its central axis. The satellite screws 525A-H may be configured to rotate in a direction that is opposite to the direction in which the single screw drum 528 rotates. In various other embodiments, the satellite screws 525A-H and the single screw drum 528 may rotate in the same direction. In particular embodiments, the rotation of the satellite screws 525A-H may be driven by a ring gear. Also, in various embodiments, the single screw drum 528 may rotate about four times faster than each individual satellite screw 525A-H. In certain embodiments, the satellite screws 525A-H each rotate at substantially similar (e.g., the same) speeds.

In various embodiments, the satellite screws 525A-H are housed within respective extruder barrels, which may, for example be about 30% open to an outer chamber of the multiple screw section 520. In particular embodiments, the rotation of the satellite screws 525A-H and single screw drum 528 may increase the surface exchange of the polymer melt (e.g., exposes more surface area of the melted polymer to the open chamber than in previous systems). In various embodiments, the multiple screw section 520 may create a melt surface area that is, for example, between about twenty and about thirty times greater than the melt surface area created by a co-rotating twin screw extruder. In a particular embodiment, the multiple screw section 520 may create a melt surface area that is, for example, about twenty-five times greater than the melt surface area created by a co-rotating twin screw extruder.

In various embodiments, the extruder 500's multiple screw section 520 is fitted with a vacuum pump (e.g., as described herein) that is attached to a vacuum attachment portion of the multiple screw section 520 so that the vacuum pump is in communication with the interior of the multiple screw section 520 via a suitable opening in the multiple screw section 520's housing. In other embodiments, the multiple screw section 520 is fitted with a series of vacuum pumps. In particular embodiments, a vacuum pump is configured to reduce the pressure within the interior of the multiple screw section 520 to a pressure that is between about 0.5 millibars and about 5 millibars. In other particular embodiments, the vacuum pump is configured to reduce the pressure in the multiple screw section 520 to between about 0 millibar and about 1.5 millibars (e.g., between about 0 millibar and about 1 millibar). In other particular embodiments, the vacuum pump is configured to reduce the pressure in the multiple screw section 520 to between approximately 0.5 millibars and 1.2 millibars. The low-pressure vacuum in the multiple screw section 520 created by the vacuum pump may remove, among other things, volatile organics present in the melted polymer as the melted polymer passes through the multiple screw section 520 and/or at least a portion of any interstitial water that was present in the wet flakes when the wet flakes entered the extruder 500. In various embodiments, the low-pressure vacuum removes substantially all (e.g., all) of the water and contaminants from the polymer stream.

In a particular example, the vacuum pump used to reduce the pressure in the multiple screw section 520 (and in any other embodiment contemplated herein) may include a plurality of (e.g., two or three) mechanical lobe vacuum pumps (e.g., arranged in series) to reduce the pressure in the multiple screw section 520 to a suitable level (e.g., to a pressure of about 1.0 millibar, to between about 0.5 millibars and 1.2 millibars, or to between about 0.5 millibars and about 5 millibars). In other embodiments, rather than using a multiple mechanical lobe vacuum pump arrangement, the system may use a vacuum pump that includes a jet vacuum pump that may be fitted to the extruder 500. In various embodiments, such a jet vacuum pump may be configured to achieve about 1 millibar of pressure in the interior of the multiple screw section 520 and similar desired intrinsic viscosity results for the polymer melt as described elsewhere herein. In other various embodiments, such a jet vacuum pump may be configured to achieve between about 0.5 millibars and 1.2 millibars of pressure in the interior of the multiple screw section 520 and similar desired intrinsic viscosity results for the polymer melt as described elsewhere herein. In other various embodiments, such a jet vacuum pump may be configured to achieve between about 0.5 millibars and about 5 millibars of pressure in the interior of the multiple screw section 520 and similar desired intrinsic viscosity results for the polymer melt as described elsewhere herein. Using a jet vacuum pump may be advantageous because jet vacuum pumps are steam powered and therefore substantially self-cleaning (e.g., self-cleaning), thereby reducing required maintenance in comparison to mechanical lobe pumps (which may, for example, require repeated cleaning due to volatiles coming off the polymer melt and condensing on the lobes of the pump). In a particular embodiment, the vacuum pump used with extruder 500 is a jet vacuum pump is made by Arpuma GmbH of Bergheim, Germany.

In particular embodiments, after the molten polymer is run through the multiple screw section 520, the streams of molten polymer are recombined and flow into the extruder 500's second single-screw extruder section 540. In various embodiments, the resulting single stream of molten polymer may next be run through a filtration system that includes at least one filter. Such a filtration system may include two levels of filtration (e.g., a 40 micron screen filter followed by a 25 micron screen filter). Although, in various embodiments, water and volatile organic impurities are removed during the vacuum process as discussed above, particulate contaminates such as, for example, aluminum particles, sand, dirt, and other contaminants may remain in the polymer melt. Thus, this filtration step may be advantageous in removing particulate contaminates (e.g., particulate contaminates that were not removed in the multiple screw section 520).

In particular embodiments, a viscosity sensor (e.g., as described herein) may be used to sense a melt viscosity of the molten polymer stream, for example, following its passage through a filtration system. The system may utilize the viscosity sensor to measure the melt viscosity of a stream, for example, by measuring the stream's pressure drop across a known area. In particular embodiments, in response to measuring an intrinsic viscosity of the stream that is below a predetermined level (e.g., below about 0.8 g/dL), the system may discard the portion of the stream with low intrinsic viscosity and/or lower the pressure in the multiple screw section 520 in order to achieve a higher intrinsic viscosity in the polymer melt. In particular embodiments, decreasing the pressure in the multiple screw section 520 is executed in a substantially automated manner (e.g., automatically) using the viscosity sensor in a computer-controlled feedback control loop with a vacuum pump.

Removing the water and contaminates from the polymer may improve the intrinsic viscosity of the recycled PET polymer by allowing polymer chains in the polymer to reconnect and extend the chain length. In particular embodiments, following its passage through the multiple screw section 520 as operated in conjunction with an attached vacuum pump, recycled polymer melt has an intrinsic viscosity of at least about 0.79 dL/g (e.g., of between about 0.79 dL/g and about 1.00 dL/g). In particular embodiments, passage through a low pressure multiple screw section 520 purifies the recycled polymer melt (e.g., by removing the contaminants and interstitial water). In particular embodiments, the water removed by passing through a lowered pressure environment includes both water from the wash water used to clean the recycled PET bottles as described above, as well as from unreacted water generated by the melting of the PET polymer in, for example, the first single-screw extruder section 510 (e.g., interstitial water). In some embodiments, the majority of water present in the polymer is wash water, but some percentage may be unreacted water.

Referring again to FIG. 5, a color sensor may be used to determine a color of the resultant polymer melt created by the extruder 500. In various embodiments, the color sensor may include one or more spectrographs configured to separate light shone through the polymer melt into a frequency spectrum to determine the color of the polymer melt. In other embodiments, the color sensor may include one or more cameras or other suitable imaging devices configured to determine a color of the resultant polymer melt. In particular embodiments, in response to determining that the color of the polymer melt is a color other than a desired color (e.g., the polymer melt is lighter than desired, darker than desired, a color other than the desired color, etc.) the system may discard the portion of the stream with the incorrect color and/or adjust an amount of color concentrate that is added to the flake and/or the polymer melt upstream in order to adjust a color of the resultant polymer melt. In particular embodiments, adjusting the amount of color concentrate is executed in a substantially automated manner (e.g., automatically) using the color sensor in a computer-controlled feedback control loop.

In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products. Spinning Machine 350 (or multiple spinning machines) may be configured to turn molten polymer into bulked continuous filament. For example, in various embodiments, the output of the extruder 500 (e.g., of the second single-screw extruder section 540 of the extruder 500) may be connected substantially directly (e.g., directly) to the input of a spinning machine so that molten polymer from the extruder 500 may be fed directly into such a spinning machine. This may be advantageous because, unlike with recycled polymer that is mixed with virgin PET polymer, molten polymer produced according to disclosed embodiments may not need to be cooled into pellets after extrusion. In particular embodiments, not having to cool the recycled molten polymer into pellets allows the disclosed embodiments to avoid potential chain scission in the polymer that might lower the polymer's intrinsic viscosity.

A spinning machine (or multiple spinning machines) receiving molten polymer from the extruder 500 may extrude such molten polymer through small holes in a spinneret in order to produce carpet yarn filament from the polymer. In particular embodiments, this molten recycled PET polymer may cool after leaving the spinneret. The carpet yarn may then be provided to rollers and ultimately turned into filament that may be used to produce carpet. In various embodiments, carpet yarn produced by a spinning machine using polymer produced according to the disclosed embodiments may have a tenacity between about 3 gram-force per unit denier (gf/den) and about 9 gf/den. In particular embodiments, the resulting carpet yarn has a tenacity of at least about 3 gf/den.

Example Extrusion Process for Melting and Purifying PET Polymer Flakes

Figure 7:
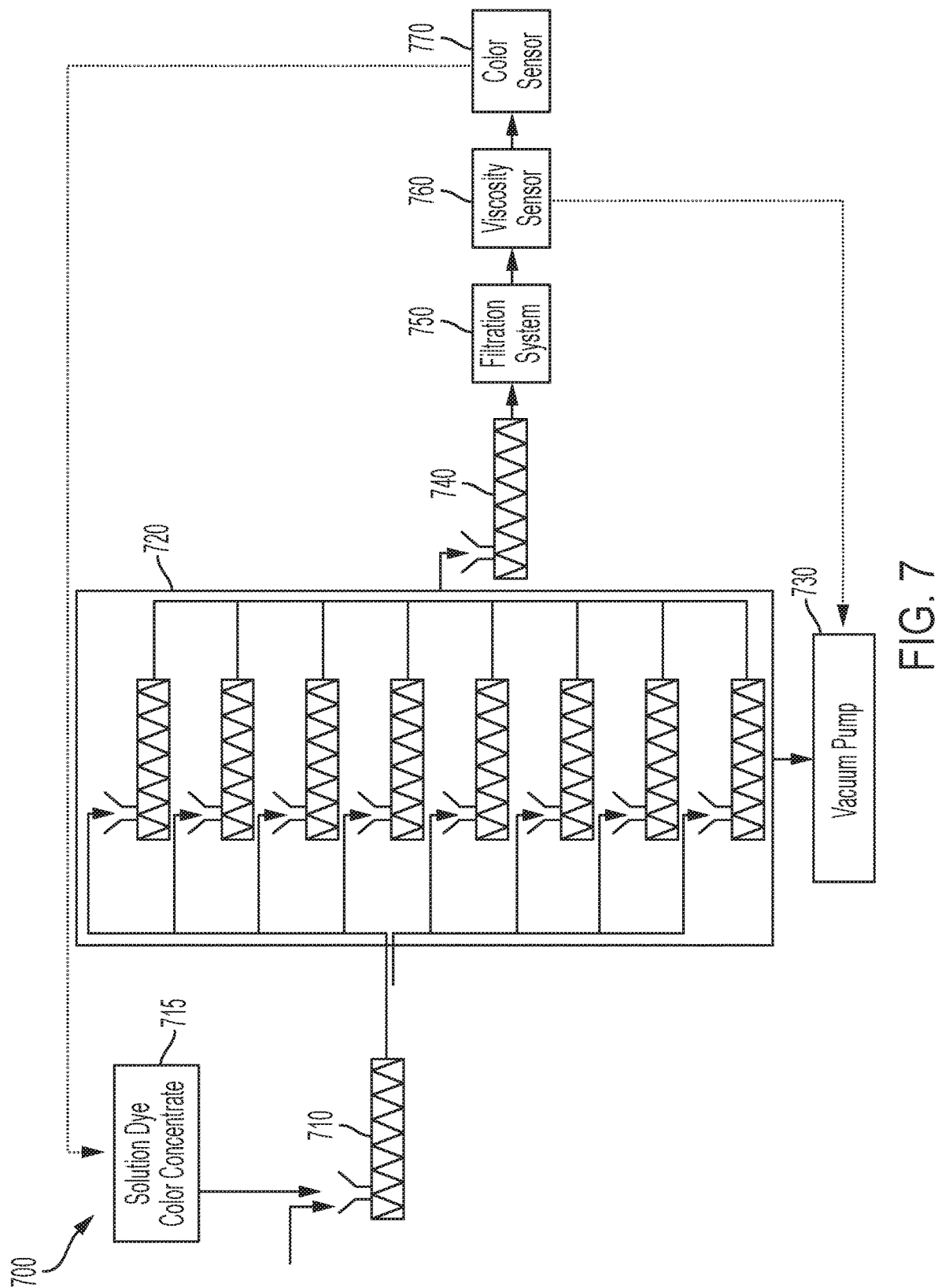
FIG. 7 is a block diagram of another exemplary system for manufacturing bulked continuous filament from polymer flakes according to an embodiment.

FIG. 7 depicts an example process flow 700 that illustrates the various processes that may performed by an extruder in a particular embodiment. In the embodiment shown in this figure, the system may first feed wet flakes through a first single-screw extruder section 710, which may, for example, generate sufficient heat (e.g., via shearing) to at least substantially melt (e.g., melt) the wet flakes.

The system may further be configured to add a Solution Dye Color Concentrate 715 to the flakes (e.g., wet flakes) before feeding the flakes into the first single-screw extruder section 710. The Solution Dye Color Concentrate 715 may include any suitable color concentrate, which may, for example, result in a particular color of polymer fiber following extrusion. In particular embodiments, the color concentrate may be made up of pelletized color concentrate in combination with a carrier resin that may bind the colorant to the polymer. The system may add color concentrate to the flakes prior to extrusion to create polymer filament that is at least partially impregnated (e.g., impregnated) with a color pigment. In various embodiments, carpet produced from solution dyed filament may be resistant to color loss through fading from sunlight, ozone, harsh cleaning agents such as bleach, or other factors.

The system may adjust an amount of Solution Dye Color Concentrate 715 to be added to the flakes prior to feeding the flakes thought the first single-screw extruder section 710. In particular embodiments, the system is configured to add between about two percent and about three percent color concentrate by mass to the polymer flake. In other embodiments, the system is configured to add between about zero percent and about three percent color concentrate by mass to the polymer flake. In still other embodiments, the system is configured to add up to about six percent color concentrate by mass to the polymer flake. In still other embodiments, the system is configured to add between about one percent and three percent color concentrate by mass to the polymer flake. The system may be configured to add any suitable ratio of color concentrate to polymer flake in order to achieve a particular color of molten polymer (and ultimately polymer fiber) following extrusion.

Note that, while the Solution Dye Color Concentrate 715 is depicted as added to the polymer flake prior to feeding the flake through the first single-screw extruder section 710 in the figure, it should be understood that in other embodiments, the Solution Dye Color Concentrate 715 may be added during any other suitable phase of the process described in this document. For example, the system may be configured to add the Solution Dye Color Concentrate 715 following extrusion of the polymer flake by the first single-screw extruder section 710 but prior to feeding the resultant polymer melt through the extruder's multiple screw section 720 as discussed below. In still other embodiments, the system may add the Solution Dye Color Concentrate 715 after the flake has passed through the multiple screw section 720 prior to passing the polymer melt through the second single screw section 740 discussed below. In still other embodiments, the system may add the Solution Dye Color Concentrate 715 while the flakes and/or polymer melt are being extruded in the first single-screw extruder section 710, the multiple screw section 720, the second single screw section 740, or at any other suitable phase of the process. In still other embodiments, the system may add the Solution Dye Color Concentrate 715 during one or more (e.g., a plurality) of the phases of the process described herein (e.g., the system may add some Solution Dye Color Concentrate 715 to the polymer flake prior to passing the flake through the first single-screw extruder section 710 and some additional Solution Dye Color Concentrate 715 following extrusion through the multiple screw section 720).

Following the addition of the color concentrate and extrusion by the first single-screw extruder section 710, the system may feed the resultant polymer melt (e.g., comprising the melted flakes and color concentrate) into the multiple screw section 720, in which the system separates the melt flow into a plurality of different streams (e.g., 4, 6, 8, or more streams) through a plurality of open chambers. In particular embodiments, the melt flow may be separated into many streams as described in regard to FIG. 4. In other embodiments, the melt flow may be separated into various numbers of streams as described in regard to FIG. 5. In still other embodiments, a stream of melted polymer may be separated into any number of streams to increase exposure of the polymer to a lowered pressure environment.

The multiple screw section 720 may be fitted with a Vacuum Pump 730 that is attached to a vacuum attachment portion of the multiple screw section 720 so that the Vacuum Pump 730 is in communication with the interior of the multiple screw section 720 via a suitable opening in the multiple screw section 720's housing. In other embodiments, the multiple screw section 720 is fitted with a series of vacuum pumps. In particular embodiments, the Vacuum Pump 730 is configured to reduce the pressure within the interior of the multiple screw section 720 to a pressure that is between about 0.5 millibars and about 5 millibars. In other embodiments, the Vacuum Pump 730 is configured to reduce the pressure in the multiple screw section 720 to less than about 1.5 millibars (e.g., about 1 millibar or less). In still other embodiments, the Vacuum Pump 730 is configured to reduce the pressure in the multiple screw section 720 to between about 0.5 millibars and 1.2 millibars. The low-pressure vacuum created by the Vacuum Pump 730 in the multiple screw section 720 may remove volatile organics present in the melted polymer as the melted polymer passes through the multiple screw section 720 and/or at least a portion of any interstitial water that was present in the wet flakes when the wet flakes were provided to the system. In various embodiments, the low-pressure vacuum removes substantially all (e.g., all) of the water and contaminants from the polymer stream.

In a particular example, the Vacuum Pump 730 comprises a plurality of (e.g., two or three) mechanical lobe vacuum pumps (e.g., arranged in series) to reduce the pressure in the chamber to a suitable level (e.g., to a pressure of about 1.0 millibar, to a pressure of between about 0.5 millibars and about 5 millibars, to a pressure of between about 0.5 millibars and 1.2 millibars, or to a pressure of less than about 1.5 millibar). In other embodiments, rather than the multiple mechanical lobe vacuum pump arrangement discussed above, the Vacuum Pump 730 includes a jet vacuum pump fit to the multiple screw section 720. In such embodiments, the jet vacuum pump is configured to achieve a desired pressure (e.g., about 1 millibar, between about 0.5 millibars and about 5 millibars, between about 0.5 millibars and 1.2 millibars, or less than about 1.5 millibar) in the interior of the multiple screw section 720 and desired results such as those described herein regarding a resulting intrinsic viscosity of the polymer melt. In various embodiments, using a jet vacuum pump can be advantageous because jet vacuum pumps are steam powered and therefore substantially self-cleaning (e.g., self-cleaning), thereby reducing the maintenance required in comparison to mechanical lobe pumps (which may, for example, require repeated cleaning due to volatiles coming off and condensing on the lobes of the pump). In a particular embodiment, the Vacuum Pump 730 is a jet vacuum pump is made by Arpuma GmbH of Bergheim, Germany.

In particular embodiments, after the molten polymer is run through the multiple screw section 720, the streams of molten polymer may be recombined and provided to the second single screw section 740. In various embodiments, the system sends the single stream of molten polymer through a Filtration System 750 that includes at least one filter. In a particular embodiment, the Filtration System 750 includes two levels of filtration (e.g., a 40 micron screen filter followed by a 25 micron screen filter). Although, in various embodiments, water and volatile organic impurities are removed during the vacuum process as discussed above, particulate contaminants such as, for example, aluminum particles, sand, dirt, and other contaminants may remain in the polymer melt. Thus, this filtration step may be advantageous in removing particulate contaminants (e.g., particulate contaminants that were not removed in the multiple screw section 720).

In particular embodiments, a Viscosity Sensor 760 may be used to sense the melt viscosity of the molten polymer stream following its passage through the Filtration System 750. In various embodiments, Viscosity Sensor 760 may measure the melt viscosity of the stream, for example, by measuring the stream's pressure drop across a known area. In particular embodiments, in response to measuring an intrinsic viscosity of the stream that is below a predetermined level (e.g., below about 0.8 g/dL), the system may discard the portion of the stream with low intrinsic viscosity and/or lower the pressure in the multiple screw section 720 in order to achieve a higher intrinsic viscosity in the polymer melt. In particular embodiments, decreasing the pressure in the multiple screw section 720 may be performed in a substantially automated manner (e.g., automatically) using the Viscosity Sensor 760 in a computer-controlled feedback control loop with the Vacuum Pump 730.

By removing the water and contaminates from the polymer, the system improves the intrinsic viscosity of the recycled PET polymer by allowing polymer chains in the polymer to reconnect and extend the chain length. In particular embodiments, following its passage through the multiple screw section 720 with its attached Vacuum Pump 730, the recycled polymer melt has an intrinsic viscosity of at least about 0.79 dL/g (e.g., of between about 0.79 dL/g and about 1.00 dL/g). In particular embodiments, passage through the low pressure multiple screw section 720 purifies the recycled polymer melt (e.g., by removing the contaminants and interstitial water) and makes the recycled polymer substantially structurally similar to (e.g., structurally the same as) pure virgin PET polymer. In particular embodiments, the water removed by the Vacuum Pump 730 includes both water from the wash water used to clean the recycled PET bottles as described above, as well as from unreacted water generated by the melting of the PET polymer in the first single-screw extruder section 710 (e.g., interstitial water). In particular embodiments, the majority of water present in the polymer is wash water, but some percentage may be unreacted water.

The system may employ a Color Sensor 770 to determine a color of the resultant polymer melt. In various embodiments, the Color Sensor 770 may utilize one or more spectrographs configured to separate light shone through the polymer melt into a frequency spectrum to determine the color of the polymer melt. In other embodiments, the Color Sensor 770 may utilize one or more cameras or other suitable imaging devices configured to determine a color of the resultant polymer melt. In particular embodiments, in response to determining that the color of the polymer melt is a color other than a desired color (e.g., the polymer melt is lighter than desired, darker than desired, a color other than the desired color, etc.) the system may discard the portion of the stream with the incorrect color and/or adjust an amount of Solution Dye Color Concentrate 715 that is added to the flake and/or the polymer melt upstream in order to adjust a color of the resultant polymer melt. In particular embodiments, adjusting the amount of Solution Dye Color Concentrate 715 may be performed in a substantially automated manner (e.g., automatically) using the Color Sensor 770 in a computer-controlled feedback control loop.

In particular embodiments, the system of FIG. 7 may produce polymer from a recycled PET polymer (e.g., obtained 100% from post-consumer PET products, such as PET bottles or containers) that has a polymer quality that is suitable for use in producing PET carpet filament using substantially only (e.g., only) PET from recycled PET products.

Use of a Crystallizer

In various embodiments, the disclosed systems and processes for producing BCF may further include a crystallizing step that utilizes one or more PET crystallizers. In particular embodiments, the system may be configured to perform the crystallization step on the ground flakes prior to processing the flakes through the one or more extruders or melting systems (e.g., single screw extruder, multiple screw extruder, melt processing unit, MRS extruder, etc.). A PET crystallizer may include a housing, a hopper screw (e.g., an auger) disposed at least partially within the housing, a stirring apparatus, one or more heating elements, and one or more blowers.

In particular embodiments, the hopper screw may be any suitable screw conveyor (e.g., such as an Archimedes' screw) for moving liquid or granular materials (e.g., such as PET flakes). In various embodiments, the hopper screw comprises a substantially cylindrical shaft and a helical screw blade disposed along at least a portion of the cylindrical shaft. In particular embodiments, the substantially cylindrical shaft may be configured to rotate the screw blade, causing that hopper screw to move material (e.g., the PET flakes) along the cylindrical shaft and into the crystallizer housing. In other embodiments, the hopper screw comprises any other suitable screw conveyer such as, for example, a shaftless spiral. In embodiments in which the hopper screw comprises a shaftless spiral, the shaftless spiral may be substantially fixed at one end and free at the other end and configured to be driven at the fixed end. In various embodiments, the hopper screw is disposed at least partially within the crystallizer housing. A hopper screw may be configured to feed PET flakes into the crystallizer. In various embodiments, the PET crystallizer is configured to feed the PET flakes into the crystallizer using the hopper screw relatively slowly In various embodiments, the crystallizer may include one or more heating elements for raising a temperature within the crystallizer. The one or more heating elements may include one or more electric heating elements, one or more gas-fired heating elements, and/or any other suitable heating elements or combinations thereof. In some embodiments, the one or more heating elements may be substantially electrically powered. In various embodiments, the one or more heating elements comprise one or more infra-red heating elements. In other embodiments, the one or more heating elements may utilize natural gas such as, for example, propane. In particular embodiments, the one or more heating elements may be configured to raise a temperature within the crystallizer to between about 100 degrees Fahrenheit and about 180 degrees Fahrenheit. In still other embodiments, the one or more heating elements may be configured to raise a temperature within the crystallizer to between about 100 degrees Celsius and 180 degrees Celsius. In still other embodiments, the one or more heating elements may be configured to raise a temperature within the crystallizer to between about 80 degrees Celsius and 120 degrees Celsius. In some embodiments, the one or more heating elements may be configured to maintain a temperature within the crystallizer that is substantially about a maximum crystallization temperature of PET. In particular embodiments, the maximum crystallization temperature of PET is between about 140 degrees Celsius and about 230 degrees Celsius.

In various embodiments, the crystallizer may further include one or more blowers configured to blow air over the flakes as the flakes pass through the crystallizer. In particular embodiments, the one or more blowers utilize any one or more suitable blowers for moving air substantially across a surface area of the flakes as the flakes pass through the crystallizer. For example, in some embodiments, the one or more blowers may include one or more suitable fans or other suitable mechanisms for moving air. In various embodiments, the one or more blowers may be configured to blow air that has been at least partially heated by the one or more heating elements. In particular embodiments, the one or more blowers may be configured to blow air having a temperature of at least about 140 degrees Fahrenheit. In other embodiments, the one or more blowers may be configured to blow air having a temperature of at least about 140 degrees Celsius. In other embodiments, the one or more blowers are configured to maintain the temperature in the crystallizer between about 140 degrees Fahrenheit and about 180 degrees Fahrenheit. In other embodiments, the one or more blowers are configured to maintain the temperature in the crystallizer between about 80 degrees Celsius and 120 degrees Celsius. In some embodiments, the one or more blowers are configured to blow hot air from a bottom portion of the crystallizer and draw air from an upper portion of the crystallizer.

In various embodiments, the crystallizer may include a stirring apparatus that comprises any suitable apparatus for stirring the PET flakes while the PET flakes are passing through the crystallizer. In various embodiments, the stirring apparatus may be operated, for example, by any suitable gear motor. In a particular embodiment, the stirring apparatus comprises a suitable rod or other suitable mechanism mounted to rotate, or otherwise stir the PET flakes as the PET flakes are passing through the crystallizer. In other embodiments, the stirring apparatus may comprise any suitable tumbler, which may, for example, comprise a drum mounted to rotate via the gear motor such that the PET flakes are at least partially stirred and/or agitated while the PET flakes are within the drum. In still other embodiments, the stirring apparatus comprises one or more screws and/or augers configured to rotate and stir the PET flakes. In particular embodiments, the stirring apparatus comprises the hopper screw.

As may be understood from this disclosure, the stirring apparatus is configured to agitate or stir the PET flakes as the one or more blowers blow air heated by the one or more heating elements across the PET flakes. In particular embodiments, the stirring apparatus may be configured to at least partially reduce agglomeration (e.g., sticking or clumping of the flake) while the flake is at least partially crystallizing in the crystallizer.

In particular embodiments, the crystallizer at least partially dries the surface of the PET flakes. In various embodiments, the PET crystallizer may be configured to reduce a moisture content of the PET flakes to about 50 ppm. In other embodiments, the PET crystallizer may be configured to reduce a moisture content of the PET flakes to between about 30 ppm and 50 ppm.

In various embodiments, the use of drier flakes may enable the system to run the flakes through an extruder or melting system more slowly, which may allow for higher pressure within the system during extrusion (e.g., may enable the system to maintain a higher pressure within a multiple stream section, rather than very low pressure). In various embodiments of the process, the pressure regulation system may be configured to maintain a pressure within an extruder or a melt processing system of between about 0 millibars and about 25 millibars. In particular embodiments, such as embodiments in which the PET flakes have been run through a crystallizer before being extruded or melted, the pressure regulation system may be configured to maintain a pressure within an extruder or a melt processing system of between about 0 and about 18 millibars. In other embodiments, the pressure regulation system may be configured to maintain a pressure within an extruder or a melt processing system between about 0 and about 12 millibars. In still other embodiments, the pressure regulation system may be configured to maintain a pressure within an extruder or a melt processing system between about 0 and about 8 millibars. In still other embodiments, the pressure regulation system may be configured to maintain a pressure within an extruder or a melt processing system between about 5 millibars and about 10 millibars. In still other embodiments, the pressure regulation system may be configured to maintain a pressure within an extruder or a melt processing system between about between about 0.5 millibars and about 5 millibars. In still other embodiments, the pressure regulation system may be configured to maintain a pressure within an extruder or a melt processing system between about 0.5 millibars and 1.2 millibars. In still other embodiments, the pressure regulation system may be configured to maintain a pressure within an extruder or a melt processing system of less than about 1.5 millibars. In particular embodiments, the pressure regulation system may be configured to maintain a pressure within an extruder or a melt processing system at about 5 millibars, about 6 millibars, about 7 millibars, about 8 millibars, about 9 millibars, or about any suitable pressure between about 0 millibars and about 25 millibars.

In particular embodiments, the crystallizer causes the flakes to at least partially reduce in size, which may, for example, reduce a potential for the flakes to stick together. In particular embodiments, the crystallizer may particularly reduce stickiness of larger flakes, which may, for example, include flakes comprising portions of the ground PET bottles which may be thicker than other portions of the PET bottles (e.g., flakes ground from a threaded portion of the PET bottle on which a cap would typically be screwed).

The Use of Colored PET Polymer and Color Additives

The disclosed systems and processes for manufacturing recycled bulked continuous filament described herein may utilize colored (non-clear) post-consumer PET bottles (e.g., or other containers) in addition to the clear PET bottles described elsewhere herein. For example, in various embodiments, the system may utilize blue, green, amber or any other suitable colored containers (e.g., bottles) in the production of recycled BCF (e.g., rather than removing substantially all of the colored PET from the recycled PET in the initial stages of the process). In certain embodiments, the process includes one or more additional steps that include, for example, adding one or more color additives (e.g., one or more solution dye color concentrates), which may dilute or alter a discoloration of the resulting recycled fiber caused by using colored PET in the recycling process.

The polymer PET containers used in the production of BCF may include particular percentages of clear and colored containers (e.g., by volume, by mass, etc.). For example, in particular embodiments, recycled BCF may be produced using at least about 80% (e.g., 80%) clear containers and no more than about 20% (e.g., 20%) colored containers. In various embodiments, the colored containers that the system uses along with clear containers to produce the recycled BCF may include only recycled containers of a particular color (e.g., only green bottles, only blue bottles, only amber bottles, etc.). In various embodiments, the system may be configured to use containers of a particular shade of a particular color. For example, the system may be configured to utilize light blue containers (e.g., bottles of a particular light shade of blue) but not to use dark blue containers. In still other embodiments, the system may be configured to use any suitable colored containers (e.g., or other sources of recycled PET) in any suitable ratio.

In various embodiments, the disclosed processes may utilize between about 6.5 percent (e.g., 6.5 percent) and about nine percent (e.g., nine percent) colored PET with the remainder being clear PET. In other embodiments, the disclosed processes may use between about six and about ten percent colored PET. In still other embodiments, the disclosed processes may use up to about ten percent colored PET with balance substantially clear PET. In still other embodiments, the disclosed processes may utilize between about one percent colored PET and about ten percent colored PET with balance substantially clear PET. In other embodiments, the disclosed processes may use any other suitable ratio of colored recycled PET to clear recycled PET.

In various embodiments, an amount of non-clear PET bottles used in the disclosed processes may be based at least in part on a color of carpet into which the BCF produced by the disclosed processes will ultimately be made. For example, for darker carpets, the BCF used in their creation may be produced using a higher percentage of colored (e.g., non-clear) recycled PET polymer containers. In various embodiments, the use of a higher percentage of colored PET containers may result in darker BCF filament, which may, for example, be unsuitable for the production of particular colored carpets (e.g., lighter carpets). Carpets that will ultimately be dyed in darker colors (e.g., or solution dyed into a darker color) may be more suitable for production using BCF produced at least partially from colored PET containers. For example, the production of BCF for use in brown carpets may utilize at least a particular amount of amber PET bottles in the recycling process (e.g., 20% amber and 80% clear, or any other suitable ratio).

In a particular example, the system may use 2% or less of non-clear PET bottles in the process when producing relatively light-colored BCF. This may help to reduce or eliminate the need to use offsetting color concentrate (as discussed in greater detail below) to achieve the desired light-colored BCF.

In certain situations, it may be advantageous to use high percentages of non-clear PET containers since doing so may reduce the amount of solution dye needed to achieve the desired color. For example, it may be advantageous to use over about 80%, over about 90%, over about 95%, or about 100% non-clear PET in using the process to produce certain dark-colored (or other colored) recycled BCF. In various embodiments, it may be advantageous to use over 95% non-clear PET in producing dark-green recycled BCF since doing so may reduce the amount of solution dye needed to attain the desired dark-green color.

In various embodiments, it may be acceptable to use the percentages of non-clear PET that are commonly available in purchased lots of curbside recycled bottles. Such percentages typically range from between about 6.5% to 9.5% non-clear PET. In particular situations, where such ranges are acceptable, the system may be adapted not to sort non-clear PET from clear PET. Rather, non-clear and clear PET may be processed and used together according to various embodiments. However, non-PET polymers may be separated from the mix and discarded as described above.

In particular embodiments, the system may be configured to use any suitable solution dyeing technique to at least partially offset (e.g., substantially offset) any discoloration of the BCF filament resulting from the above process when utilizing colored recycled PET. In various embodiments, the system may be configured to add a color concentrate to polymer flakes prior to extrusion (e.g., or to polymer melt during or after extrusion) in order to at least partially offset a coloration of the resultant filament due to the use of colored recycled PET. Such a color concentrate may include any suitable color concentrate, which may, for example, result in a particular color of polymer fiber (e.g., bulked continuous filament) following extrusion. In various embodiments, adding color concentrate to the flakes prior to extrusion may result in polymer filament that is at least partially impregnated (e.g., impregnated) with a color pigment. The impregnated color pigment may offset any discoloration of the resulting fiber that may have resulted due to the use of colored recycled PET in the extrusion process. Carpet produced from solution dyed filament may be highly resistant to color loss through fading from sunlight, ozone, harsh cleaning agents such as bleach, or other factors.

In various embodiments, the color concentrate includes any suitable dispersion of color in a compatible carrier. In some embodiments, color concentrates are designed so that, when added to a natural resin (e.g., PET) in a set proportion, they color the resin substantially evenly (e.g., evenly) to match a desired color. In some embodiments, the color may comprise mixtures of pigments, which may, for example, include particles of insoluble colored material, in the resin. In other embodiments, color concentrates may include one or more polymer-soluble dyes that are suitable alone or in combination with one or more pigments.

In particular embodiments, the system is configured to add between about two percent (e.g., two percent) and about three percent (e.g., three percent) color concentrate by mass to the polymer flake. In other embodiments, the system is configured to add between about zero percent (e.g., zero percent) and about three percent (e.g., three percent) color concentrate by mass or volume. In still other embodiments, the system is configured to add up to about six percent (e.g., six percent) color concentrate by mass to the polymer flake prior to extrusion. In some embodiments, the system is configured to add between about one percent (e.g., one percent) and about three percent (e.g., three percent) color concentrate by mass to the polymer flake. In still other embodiments, the system is configured to add any suitable ratio of color concentrate to polymer flake in order to achieve a particular color of molten polymer (and ultimately polymer fiber) following extrusion.

It should be understood that, in the various contemplated embodiments, a color concentrate may be added during any suitable phase of the processes described in this document. For example, in various embodiments, such as any of the examples discussed above, the system may be configured to add the color concentrate following extrusion of the polymer flake by a first single-screw extruder section but prior to feeding the resultant polymer melt through an extruder's multiple screw section, as discussed herein. In other embodiments, the system may add a color concentrate after the flake has passed through an extruder's multiple screw section but prior to passing the polymer melt through a second single screw section, as discussed herein. In still other embodiments, the system may add a color concentrate while the flakes and/or polymer melt are being extruded in a first single-screw extruder section, into a multiple screw section, into a second single screw section, into any combination of these, or at any other suitable phase of the process. In still other embodiments, the system may add the color concentrate during one or more (e.g., a plurality) of the phases of the process described herein (e.g., the system may add some color concentrate to the polymer flake prior to passing the flake through a single-screw extruder section and also add solution color concentrate following extrusion through a multiple screw section).

In various embodiments, the use of a color concentrate may at least partially mask any coloration of the resulting BCF created using the disclosed processes using colored recycled PET. In such embodiments, the resulting BCF may have a color that is substantially similar to a color of BCF produced using substantially only substantially clear (e.g., clear) recycled PET and a color concentrate.

In various embodiments, the system may be configured to substantially automatically adjust an amount of color concentrate added to the polymer flake and/or polymer melt in order to produce a desired color of BCF filament, as discussed herein. In various other embodiments, the system is configured to substantially automatically determine an amount of color concentrate to add to the colored PET to sufficiently offset the color of the colored PET. In such embodiments, the system may, for example, use a suitable feedback loop that includes: (1) determining a color of bulked continuous filament produced by the process; (2) determining whether the color is acceptable (e.g., the color is determined to be a particular target color and/or the color is determined to meet one or more pre-determined color guidelines); and (3) substantially automatically adjusting an amount of color concentrate being added to the colored PET upstream based at least in part on the determined color (whether the determined color is acceptable according to one or more pre-determined color guidelines). In particular embodiments, the system may be adapted to automatically adjust an amount of color concentrate being added to the colored (non-clear) PET to assure that it is sufficient for the resulting colored PET to satisfy the one or more pre-determined color guidelines.

In various embodiments, the process may utilize any suitable dyeing technique other than the solution dyeing technique described above to, for example, at least partially mask a coloration of the filament produced using the recycled BCF process described herein with colored recycled PET. For example, in various embodiments, the disclosed processes may utilize any suitable skein dyeing technique, any suitable continuous dyeing technique, any suitable space dyeing technique, any suitable beck dyeing technique, or any other suitable dyeing technique or suitable combination of dyeing techniques.

In various embodiments, such as embodiments where the system adds one or more solution dyes to recycled PET that includes colored PET, the disclosed processes may include adding polytrimethylene terephthalate (PTT) (and/or any other suitable additive) to the PET prior to extrusion or melting, during extrusion or melting, along with the color concentrate, separately from the color concentrate, and/or at any other suitable time. In various embodiments, the mixture of PTT (and/or other additive(s)) and PET may have an enhanced dyeability compared to PET that has not been mixed with PTT. In particular embodiments, the disclosed processes include using a mixture of between about five percent (e.g., five percent) and about fourteen percent (e.g., fourteen percent) PTT (and/or other additive(s)) in the mixture by mass or volume. In other embodiments, the disclosed processes include using a mixture of between about six percent (e.g., six percent) and about ten percent (e.g., ten percent) PTT (and/or other additive(s)) in the mixture by mass or volume. In still other embodiments, the disclosed processes include adding up to about fourteen percent (e.g., fourteen percent) PTT (and/or other additive(s)) by volume or mass (e.g., between about zero percent and about fourteen percent PTT). In various embodiments, the addition of PTT (and/or other additive(s)) to the PET may reduce a cost of dyeing the resulting fiber.

In various embodiments, the disclosed processes may utilize virgin PTT. In still other embodiments, the disclosed processes may utilize recycled PTT. In some embodiments, PTT may be recycled from any suitable source such as, for example, recycled PTT carpet, recycled food containers, and/or other suitable PTT products. In various embodiments, the PTT may include recycled PTT recovered (e.g., recycled) using the processes described herein.

In various embodiments, the disclosed processes may be suitable for recycling PTT for use in mixing the recycled PTT (or other suitable additive) with PET to improve dyeability of the PET due to the similar chemical composition of PTT and PET. The resulting combination may have a higher durability and resilience than conventional polyesters (e.g., PET). In particular embodiments, PTT may be particularly useful in the production of carpet due to PTT's stain-resistant qualities. PTT carpets may, for example, at least generally maintain their original appearance through simple vacuuming and hot water extraction. This may, for example, result in a longer lifespan of carpet produced with PTT. In particular embodiments, PTT is substantially hydrophobic, which may contribute to PTT carpet's stain resistance. In various embodiments, PTT carpeting is also substantially soft (e.g., to the touch). PTT carpet's softness may result from, for example, a lack of topically-applied chemicals for stain protection due to PTT's inherent hydrophobic tendencies. It should be understood, based on the above discussion, that any suitable additive may be used in place of, or in addition to, PTT in the examples discussed above.

In various embodiments, such as embodiments in which the system adds one or more dye enhancers to recycled PET that includes non-clear PET, the disclosed processes may include adding DEG (or any other suitable dye enhancer) to the PET prior to extrusion, during extrusion, along with color concentrate, separately from color concentrate, or at any other suitable time. In various embodiments, the mixture of the dye enhancer and PET may have an enhanced dyeability compared to PET that has not been mixed with the dye enhancer. In particular embodiments, the process includes using a mixture of between about zero percent (e.g., zero percent) and about five percent (e.g., five percent) dye enhancer (e.g., DEG) in the mixture by mass or volume. In certain embodiments, the process includes using a mixture of between about one percent (e.g., one percent) and about two percent (e.g., two percent) dye enhancer (e.g., DEG) in the mixture by mass or volume.

Using Variable Quality Recycled PET Polymer Containers as Source Material

The disclosed systems may be configured to adjust particular components of the process based at least in part on the source of recycled PET being used to produce the bulked continuous carpet filament. For example, because deposit PET bottles include fewer impurities that need to be removed during the initial cleaning and sorting phases of the process, the systems and methods set forth herein may be adjusted to process such bottles. In a particular embodiment, a pressure regulation system may be configured to maintain a pressure within an extruder or melt processing unit chamber of between about 0 millibars and about 12 millibars when flakes derived from deposit PET bottles are being processed. Alternatively, PET flake derived from curbside recycled PET bottles may have greater quantities of impurities and other polymers. Thus, in such embodiments, a pressure regulation system may be configured to maintain a pressure within an extruder or melt processing unit chamber of between about 5 millibars and about 10 millibars to address such source material.

In various embodiments, the system may be configured to determine a suitable pressure at which to maintain the pressure within an extruder or melt processing unit chamber based at least in part on the source of the recycled PET. In other embodiments, the system is configured to omit one or more of the steps described herein or to include one or more additional steps to the steps described herein based at least in part on the source of the recycled PET.

Alternative Sources of PET Polymer

The systems and processes described herein may be adapted for processing and preparing old carpet (or any other suitable post-consumer product) to produce new carpet yarn comprising 100% recycled carpet. In such embodiments, the process may begin by grinding and washing recycled carpet rather than recycled PET containers. In various embodiments where old carpet is converted into new carpet yarn comprising 100% recycled carpet, the process may include additional steps to remove additional materials or impurities that may be present in recycled carpet that may not be present in recycled PET bottles (e.g., carpet backing, adhesive, etc.). In various embodiments, the systems and processes described herein may be adapted for processing recycled PET from any suitable source (e.g., sources other than recycled bottles or carpet) to produce new carpet yarn comprising 100% recycled PET.

CONCLUSION

Many modifications and other embodiments of the invention will come to mind to one skilled in the art to which this invention pertains having the benefit of the teachings presented in the foregoing descriptions and the associated drawings. For example, although the vacuum system discussed above is described as being configured to maintain the pressure in the open chambers of the MRS extruder to about 1 mbar, in other embodiments, the vacuum system may be adapted to maintain the pressure in the open chambers of the MRS extruder or Multiple Stream Section at pressures greater than, or less than, 1 mbar. For example, the vacuum system may be adapted to maintain this pressure at between about 0.5 mbar and about 12 mbar.

Similarly, although various embodiments of the systems described above may be adapted to produce carpet filament from substantially only recycled PET (so the resulting carpet filament would comprise, consist of, and/or consist essentially of recycled PET), in other embodiments, the system may be adapted to produce carpet filament from a combination of recycled PET and virgin PET. The resulting carpet filament may, for example, comprise, consist of, and/or consist essentially of between about 80% and about 100% recycled PET, and between about 0% and about 20% virgin PET.

Furthermore, it should be understood that when ratios of polymers are discussed herein (e.g., as a percentage) such as a ratio of colored recycled PET to clear recycled PET, color concentrate to polymer flake, etc., the percentages may include a percentage by volume, a percentage by mass, a percentage by weight, or any other suitable relative measure.

Also, while various embodiments are discussed above in regard to producing carpet filament from PET, similar techniques may be used to produce carpet filament from other polymers. Similarly, while various embodiments are discussed above in regard to producing carpet filament from PET, similar techniques may be used to produce other products from PET or other polymers.

Furthermore, although various embodiments described herein are discussed as being adapted for producing carpet filament from polymer flakes, it should be understood in light of this disclosure that the described embodiments may, in various embodiments, be used to produce carpet filament from any other suitable source of polymer.

In addition, it should be understood that various embodiments may omit any of the steps described above or add additional steps.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

I claim:

1. A system for manufacturing bulked continuous carpet filament, the system comprising:
a first section of a melt processing unit, the first section being configured to melt a plurality of polymer flakes to create a first single stream of polymer melt;
a separation element configured to receive the first single stream of polymer melt and divide the first single stream of polymer melt into multiple streams of polymer melt;
a multiple stream section of the melt processing unit configured to:
receive the multiple streams of polymer melt,
allow the multiple streams of polymer melt to fall through the multiple stream section and into a receiving section of the melt processing unit under the weight of gravity, and
expose the multiple streams of polymer melt to a pressure within the multiple stream section of the melt processing unit as the multiple streams of polymer melt pass through the multiple stream section of the melt processing unit; and
a pressure regulation system configured to maintain the pressure within the multiple stream section of the melt processing unit as the multiple streams of polymer pass through the multiple stream section, wherein:
the receiving section of the melt processing unit is configured to:
receive the multiple streams of polymer melt,
recombine the multiple streams of polymer melt into at least one combined stream of polymer melt, and
convey the at least one combined stream of polymer melt toward at least one spinning machine that is configured to form polymer from the at least one combined stream of polymer melt into bulked continuous carpet filament, wherein the system further comprises an intrinsic viscosity management system configured to determine an intrinsic viscosity of the at least one combined stream of polymer melt, and, in response to determining the intrinsic viscosity of the at least one combined stream of polymer melt, instructing the pressure regulation system to adjust the pressure within the multiple stream section of the melt processing unit.

2. The system of claim 1, wherein the system further comprises a crystallizer configured to perform a crystallization step on the plurality of polymer flakes prior to melting the plurality of polymer flakes in the first section of the melt processing unit; and
wherein the pressure within the multiple stream section of the melt processing unit is maintained between about 0 millibars and about 12 millibars.

3. The system of claim 2, wherein the receiving section of the melt processing unit comprises a particular extruder that is adapted to recombine the multiple streams of polymer melt into the at least one combined stream of polymer melt.

4. The system of claim 3, wherein the particular extruder is disposed vertically below the separation element.

5. The system of claim 4, wherein the separation element is adapted to divide the first single stream of polymer melt into at least 8 streams of polymer melt.

6. The system of claim 5, wherein:
the separation element is adapted to divide the first single stream of polymer melt into at least 100 streams of polymer melt; and
the multiple stream section is configured to expose each of the at least 100 streams of polymer melt to a pressure of between about 0 mbar and about 5 mbar as the at least 100 streams of polymer melt pass through the multiple stream section of the melt processing unit.

7. The system of claim 6, wherein the multiple stream section is configured to expose each of the at least 100 streams of polymer melt to a pressure of between about 0 mbar and about 1.5 mbar as the at least 100 streams of polymer melt pass through the multiple stream section of the melt processing unit.

8. The system of claim 1, wherein the pressure regulation system is configured to reduce the pressure within the multiple stream section of the melt processing unit to between about 0.5 millibars and about 1.2 millibars, and to maintain the pressure within the multiple stream section of the melt processing unit between about 0.5 millibars and about 1.2 millibar while the multiple streams of polymer melt pass through the multiple stream section of the melt processing unit.

9. The system of claim 1, wherein the system is further adapted for reducing post-consumer recycled polymer material into the plurality of polymer flakes and cleansing the plurality of polymer flakes before melting the polymer flakes.

10. The system of claim 1, wherein the separation element is an extrusion die defining a plurality of holes, each of the holes creating a respective one of the multiple streams of polymer melt.

11. The system of claim 1, wherein:
the first section of the melt processing unit comprises a single screw extruder; and
the receiving section of the melt processing unit comprises a single screw extruder.

12. The system of claim 1, wherein the plurality of polymer flakes is derived, at least in part, from polyethylene terephthalate (PET) flakes that are derived from recycled PET bottles.

13. The system of claim 1, wherein:
the first section of the melt processing unit is a first extrusion means;
the separation element is a polymer melt separation means;
the multiple stream section of the melt processing unit is a second extrusion means;
the pressure regulation system is a pressure regulation means; and
the receiving section of the melt processing unit is a third extrusion means.

14. A system for manufacturing bulked continuous carpet filament, the system comprising:
means for melting a plurality of polymer flakes to create a first stream of polymer melt;
means for routing the first stream of polymer melt through a separation element to generate multiple streams of polymer melt;
means for exposing the multiple streams of polymer melt to a pressure within a multiple stream section of a melt processing unit;
means for reducing the pressure of the multiple stream section of the melt processing unit to a reduced pressure;
means for, while maintaining the pressure of the multiple stream section of the melt processing unit at the reduced pressure, allowing the multiple streams of polymer melt to fall through the multiple stream section of the melt processing unit into a receiving section of the melt processing unit under the weight of gravity;
means for recombining the multiple streams of polymer melt into at least one stream of polymer melt at the receiving section of the melt processing unit;
intrinsic viscosity measurement means for determining an intrinsic viscosity of at least one stream of polymer melt, and, in response to determining the intrinsic viscosity of the at least one stream of polymer melt, means for adjusting the pressure within the multiple stream section of the melt processing unit, and
means for providing polymer from the at least one stream of polymer melt to at least one spinning machine configured to form the polymer from the at least one stream of polymer melt into bulked continuous carpet filament.

15. A system for manufacturing bulked continuous carpet filament, the system comprising:
a first section of a melt processing unit, the first section being configured to melt polymer to create a first single stream of polymer melt;
a separation element configured to receive the first single stream of polymer melt and divide the first single stream of polymer melt into multiple streams of polymer melt;
a multiple stream section of the melt processing unit configured to:
receive the multiple streams of polymer melt,
allow the multiple streams of polymer melt to fall through the multiple stream section and into a receiving section of the melt processing unit under the weight of gravity, and
expose the multiple streams of polymer melt to a pressure within the multiple stream section of the melt processing unit as the multiple streams of polymer melt pass through the multiple stream section of the melt processing unit; and
a pressure regulation system configured to maintain the pressure within the multiple stream section of the melt processing unit as the multiple streams of polymer fall through the multiple stream section, wherein:
the receiving section of the melt processing unit is configured to:
receive the multiple streams of polymer melt,
recombine the multiple streams of polymer melt into at least one combined stream of polymer melt, and
convey the at least one combined stream of polymer melt toward at least one spinning machine that is configured to form polymer from the at least one combined stream of polymer melt into bulked continuous carpet filament, wherein the system further comprises an intrinsic viscosity management system in communication with the pressure regulation system configured to determine an intrinsic viscosity of the at least one combined stream of polymer melt, and, in response to determining the intrinsic viscosity of the at least one combined stream of polymer melt, instructing the pressure regulation system to adjust the pressure within the multiple stream section of the melt processing unit.

16. The system of claim 15, wherein:
the first section is configured to melt a plurality of polymer flakes to create the first single stream of polymer melt;
the system further comprises a crystallizer configured to perform a crystallization step on the plurality of polymer flakes prior to melting the plurality of polymer flakes in the first section of the melt processing unit; and
the pressure within the multiple stream section of the melt processing unit is maintained between about 0 millibars and about 12 millibars.

17. The system of claim 16, wherein the system is further adapted for reducing post-consumer recycled polymer material into the plurality of polymer flakes and cleansing the plurality of polymer flakes before melting the polymer flakes.

18. The system of claim 16, wherein the plurality of polymer flakes is derived, at least in part, from polyethylene terephthalate (PET) flakes that are derived from recycled PET bottles.

19. The system of claim 16, wherein the receiving section of the melt processing unit comprises a extruder that is adapted to recombine the multiple streams of polymer melt into the at least one combined stream of polymer melt.

20. The system of claim 19, wherein the extruder is disposed vertically below the separation element.

21. The system of claim 20, wherein the separation element is adapted to divide the first single stream of polymer melt into at least 8 streams of polymer melt.

22. The system of claim 21, wherein:
the separation element is adapted to divide the first single stream of polymer melt into at least 100 streams of polymer melt; and
the multiple stream section is configured to expose each of the at least 100 streams of polymer melt to a pressure of between about 0.5 mbar and about 1.2 mbar as the at least 100 streams of polymer melt pass through the multiple stream section of the melt processing unit.

23. The system of claim 15, wherein the separation element is an extrusion die defining a plurality of holes, each of the holes creating a respective one of the multiple streams of polymer melt.

24. The system of claim 15, wherein:
the first section of the melt processing unit comprises a single screw extruder; and
the receiving section of the melt processing unit comprises a single screw extruder.

25. The system of claim 15, wherein:
the first section of the melt processing unit is a first extrusion means;
the separation element is a polymer melt separation means;
the multiple stream section of the melt processing unit is a second extrusion means;
the pressure regulation system is a pressure regulation means; and
the receiving section of the melt processing unit is a third extrusion means.

26. The system of claim 14, wherein the reduced pressure comprises between about 0 millibars and about 12 millibars.

* * * * *